United States Patent
Nomura

(10) Patent No.: US 11,064,034 B2
(45) Date of Patent: Jul. 13, 2021

(54) INFORMATION PROCESSING DEVICE, EVENT MANAGEMENT SERVER, EVENT PARTICIPATION METHOD, AND EVENT PARTICIPATION MANAGEMENT METHOD

(71) Applicant: Sony Interactive Entertainment Inc., Tokyo (JP)

(72) Inventor: Masanori Nomura, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 974 days.

(21) Appl. No.: 15/237,884

(22) Filed: Aug. 16, 2016

(65) Prior Publication Data

US 2017/0064014 A1    Mar. 2, 2017

(30) Foreign Application Priority Data

Aug. 28, 2015 (JP) .............................. JP2015-169746

(51) Int. Cl.
*A63F 13/493*    (2014.01)
*H04L 29/08*    (2006.01)
(Continued)

(52) U.S. Cl.
CPC ............ *H04L 67/16* (2013.01); *A63F 13/352* (2014.09); *A63F 13/48* (2014.09); *A63F 13/71* (2014.09);
(Continued)

(58) Field of Classification Search
CPC ................. H04L 67/16; H04L 67/10
(Continued)

(56) References Cited

U.S. PATENT DOCUMENTS 7,246,169 B2    7/2007  Yoshimine
8,375,292 B2    2/2013  Coffman
(Continued)

FOREIGN PATENT DOCUMENTS

CN    101678237 A    3/2010
JP    2002077868 A    3/2002
(Continued)

OTHER PUBLICATIONS

European Search Report for corresponding EP Application No. 16184690.2, 8 pages, dated Nov. 25, 2016.
(Continued)

*Primary Examiner* — Sibte H Bukhari
(74) *Attorney, Agent, or Firm* — Matthew B. Dernier, Esq.

(57) ABSTRACT

Disclosed herein is an information processing device for acquiring, via a network, data provided as an event by a content provision server for a set duration and performing an information processing task using the data, the information processing device including: an event participation operation control section adapted to acquire, from a management server that manages an event in which a user of the information processing device is registered for participation, setup data that sets up a given operation to be started at a given time relative to a start time of the event in which the user is registered for participation, and to control the given operation such that the operation is performed at the time specified by the setup; and an information processing section adapted to perform an information processing task using the event data acquired from the content provision server and generate output data after the given operation.

12 Claims, 16 Drawing Sheets

(51) Int. Cl.
*G06Q 10/10* (2012.01)
*G06Q 10/06* (2012.01)
*A63F 13/352* (2014.01)
*A63F 13/71* (2014.01)
*A63F 13/48* (2014.01)
*A63F 13/73* (2014.01)
*H04L 12/24* (2006.01)

(52) U.S. Cl.
CPC ........ *A63F 13/73* (2014.09); *G06Q 10/06311* (2013.01); *G06Q 10/109* (2013.01); *H04L 41/0806* (2013.01); *H04L 67/10* (2013.01); *A63F 13/493* (2014.09); *A63F 2300/5593* (2013.01)

(58) Field of Classification Search
USPC .......................................................... 709/223
See application file for complete search history.

(56) References Cited

U.S. PATENT DOCUMENTS

| | | | |
|---|---|---|---|
| 9,005,027 | B2 | 4/2015 | Lee |
| 2002/0156648 | A1 | 10/2002 | Yoshimine |
| 2006/0240894 | A1 | 10/2006 | Andrews |
| 2008/0146342 | A1* | 6/2008 | Harvey ................... A63F 13/10 463/42 |
| 2008/0220873 | A1 | 9/2008 | Lee |
| 2009/0094253 | A1 | 4/2009 | Hanai |
| 2010/0185932 | A1* | 7/2010 | Coffman ................ G06Q 10/10 715/230 |
| 2010/0185933 | A1 | 7/2010 | Coffman |
| 2011/0209181 | A1* | 8/2011 | Gupta .................... H04N 7/163 725/62 |
| 2011/0276372 | A1 | 11/2011 | Spivack |
| 2015/0281430 | A1* | 10/2015 | Cho .................. H04M 1/72569 455/418 |

FOREIGN PATENT DOCUMENTS

| | | |
|---|---|---|
| JP | 2003199977 A | 7/2003 |
| JP | 2009027390 A | 2/2009 |
| JP | 2009175864 A | 8/2009 |
| JP | 2010045837 A | 2/2010 |
| JP | 2012515957 A | 7/2012 |
| JP | 2013530447 A | 7/2013 |
| JP | 2014018313 A | 2/2014 |
| JP | 2014126888 A | 7/2014 |
| JP | 5588057 B1 | 9/2014 |
| JP | 2014217542 A | 11/2014 |
| JP | 2014229289 A | 12/2014 |
| JP | 2015103031 A | 6/2015 |
| WO | 2008109132 A1 | 9/2008 |
| WO | WO-2008109132 A1 * | 9/2008 ............. G06N 3/006 |
| WO | 2011140278 A1 | 11/2011 |

OTHER PUBLICATIONS

Office Action for corresponding JP Application No. 2015-169746, 8 pages, dated Jul. 25, 2017.
Office Action for related JP Patent Application No. 2015-169747, 9 pages, dated Aug. 1, 2017.
Office Action for related JP Patent Application No. 2015-169747, 8 pages, dated Mar. 6, 2018.
The First Office Action for corresponding CN Application No. 201610694504.7, 19 pages, dated Sep. 3, 2020.

* cited by examiner

INFORMATION PROCESSING DEVICE, EVENT MANAGEMENT SERVER, EVENT PARTICIPATION METHOD, AND EVENT PARTICIPATION MANAGEMENT METHOD

BACKGROUND

The present disclosure relates to an electronic content processing technology provided by using a network.

Recent advances in information processing technologies, enhancement of networks, and other factors have made it possible to easily acquire and enjoy a variety of electronic content such as games, videos, and electronic books irrespective of the performance of devices operated by users such as personal computers and personal digital assistants and the environment in which the devices are used. Further, it has become easier for individuals to generate such electronic content and release it to the public through a variety of services such as social networking services (SNSs).

SUMMARY

As various electronic content and services have become available via networks and various media as described above, it becomes difficult to make a choice from among such options. For example, even if content that matches the preference and circumstances of a user is provided, that content is often buried among other content and fails to attract the attention of the user. Even if the content is accidentally spotted by the user by search, it is necessary to take some kind of action such as accessing an official website and gain a certain extent of knowledge before actually viewing the content or considering purchasing it. It is likely that the user may lose his or her interest or forget its existence while feeling it is troublesome to go through such a process.

The present disclosure has been devised in light of the foregoing, and it is desirable to provide a technology for accessing desired electronic content or networking service with higher efficiency.

According to an embodiment of the present disclosure, there is provided an information processing device. The information processing device acquires, via a network, data provided as an event by a content provision server for a set duration and performs an information processing task using the data. The information processing device includes an event participation operation control section and an information processing section. The event participation operation control section acquires setup data from a management server that manages an event in which a user of the information processing device is registered for participation. The setup data sets up a given operation to be started at a given time relative to a start time of the event in which the user is registered for participation. The event participation operation control section controls the given operation such that the operation is performed at the time specified by the setup. The information processing section performs an information processing task using the event data acquired from the content provision server and generates output data after the given operation.

According to another embodiment of the present disclosure, there is provided an event management server. The event management server includes a correlation information preparation section and a participation operation setup section. The correlation information preparation section prepares registration information that correlates a user of an information processing device with an event in which the user is registered for participation. The information processing device performs an information processing task using data provided as an event by a content provision server for a set duration. The participation operation setup section prepares, on the basis of the registration information, setup data that sets up a given operation to be started by the information processing device at a given time relative to a start time of the event in which the user is registered for participation, transmitting the setup data to the information processing device.

According to still another embodiment of the present disclosure, there is provided an event participation method. The event participation method is used by an information processing device that acquires, via a network, data provided as an event by a content provision server for a set duration to perform an information processing task using the data. The event participation method includes acquiring setup data from a management server that manages an event in which a user of the information processing device is registered for participation. The setup data sets up a given operation to be started at a given time relative to a start time of the event in which the user is registered for participation. The event participation method includes performing the given operation at the time specified by the setup. The event participation method includes performing an information processing task using the event data acquired from the content provision server and outputting output data to an output device after the given operation.

According to still another embodiment of the present disclosure, there is provided an event participation management method by an event management server. The event participation management method includes preparing registration information that correlates a user of an information processing device with an event in which the user is registered for participation. The information processing device performs an information processing task using data provided as an event by a content provision server for a set duration. The event participation management method includes preparing, on the basis of the registration information, setup data that sets up a given operation to be started by the information processing device at a given time relative to a start time of the event in which the user is registered for participation. The event participation management method includes transmitting the setup data to the information processing device via a network.

It should be noted that any combinations of the above components and any conversions of expressions of the present disclosure between "method," "device," "system," "computer program," and so on are also effective as modes of the present disclosure.

The present disclosure allows users to find and use desired electronic content and services with ease.

DETAILED DESCRIPTION OF THE PREFERRED EMBODIMENT

Figure 1:
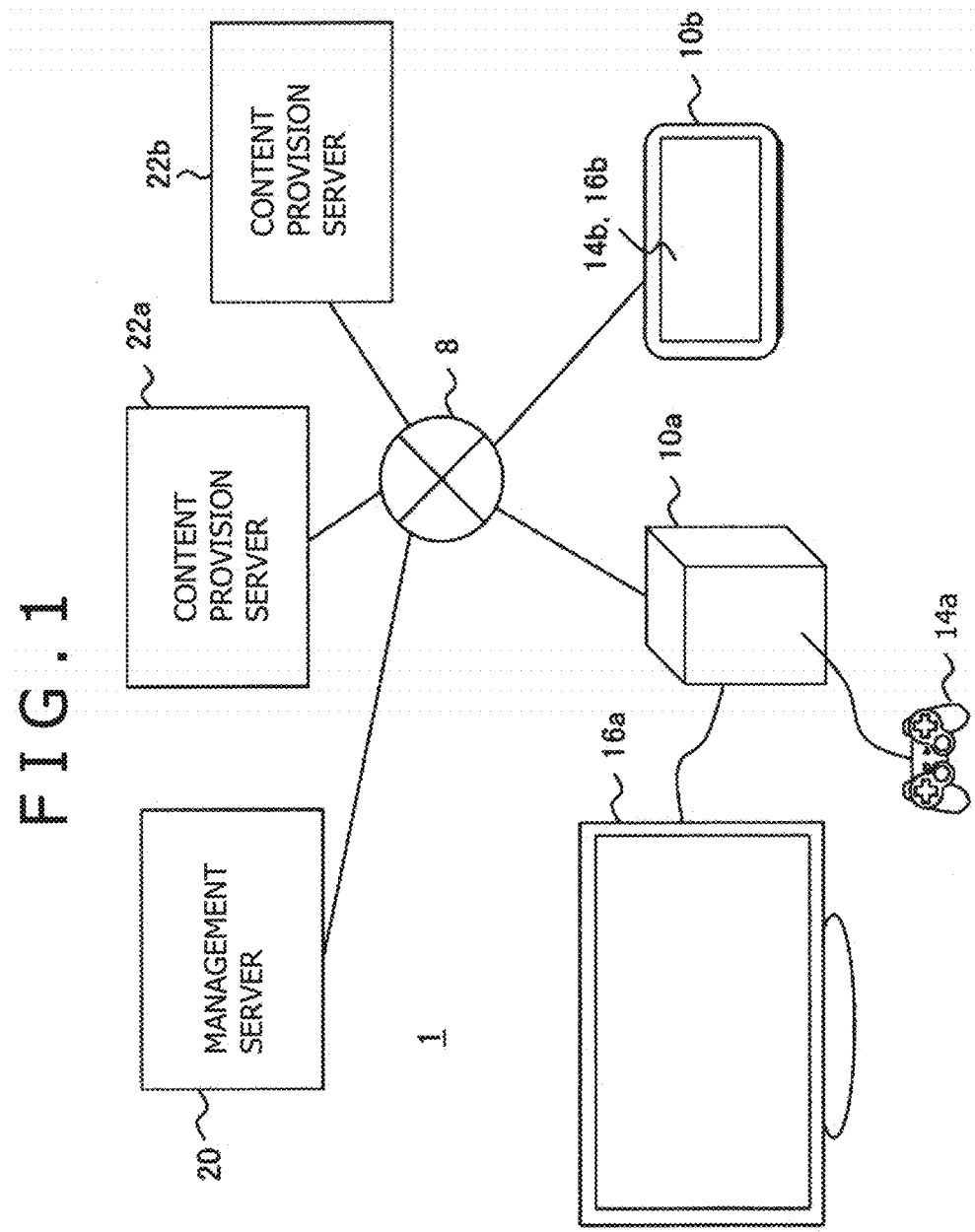
FIG. 1 is a diagram illustrating a configuration example of an information processing system according to the present embodiment.

FIG. 1 illustrates a configuration example of an information processing system according to the present embodiment. An information processing system 1 includes information processing devices 10a and 10b, a management server 20, and content provision servers 22a and 22b. The management server 20 and the content provision servers 22a and 22b can communicate with the information processing devices 10a and 10b via a network 8. The information processing devices 10a and 10b are operated by users. A display device 16a and an input device 14a may be connected to an information processing device in a wired or wireless manner as with the information processing device 10a. Alternatively, a touch panel (an input device 14b and a display device 16b) may be formed integrally with an information processing device as with the information processing device 10b. It should be noted that the mode of the information processing device is not limited thereto.

That is, the information processing device 10 may be implemented in any form of common device including game consoles, personal computers, tablets, personal digital assistants, and mobile phones. The number of the information processing devices 10a and 10b connected to the network 8 is not specifically limited. Hereinafter, the information processing devices 10a and 10b will be collectively referred to as the information processing devices 10, and the input devices 14a and 14b as the input devices 14, and the display devices 16a and 16b as the display devices 16. The content provision servers 22a and 22b provide electronic content to the information processing devices 10 via the network 8. In the present embodiment in particular, we assume that such electronic content is that which can be used by the information processing devices 10 that make access via the network 8 for a set duration by providing some kind of electronic data to the information processing devices 10.

To that extent, details of content provided by the content provision servers 22a and 22b are not specifically limited. Among possible pieces of content are campaigns and events organized, for example, by game creation companies in relation to specific games, and delivery of videos through live streaming. Therefore, the content provision servers 22a and 22b are managed by a variety of organizations such as game creation companies, licensees, and video delivery companies, and the number thereof is not limited. Hereinafter, the content provision servers 22a and 22b will be collectively referred to as the content provision servers 22, and content provided thereby as "events."

The management server 20 plays a role of matching a variety of events held by the content provision servers 22 with users who operate the information processing devices 10. More specifically, the management server 20 presents information about events scheduled to start, allowing users to efficiently select events in which they wish to participate. Further, the management server 20 notifies the users when start times of the selected events approach, thus preventing the users from missing their opportunities for participation. Further, depending on setup, the management server 20 controls the information processing devices 10 to automatically activate in step with the events, positively allowing the users to participate.

Thanks to these components, users are easily informed about the existence of events that suit their tastes. Further, their interest is aroused again afterwards after passage of time ahead of the start, thus reducing the likelihood that they may miss their opportunities for participation. In addition, opportunities for contact between users and event organizers can be increased, and barriers to be overcome before they participate can be reduced, thus giving users a chance to become interested in games and other related products and making it easier for users to understand the appeal thereof.

Figure 2:
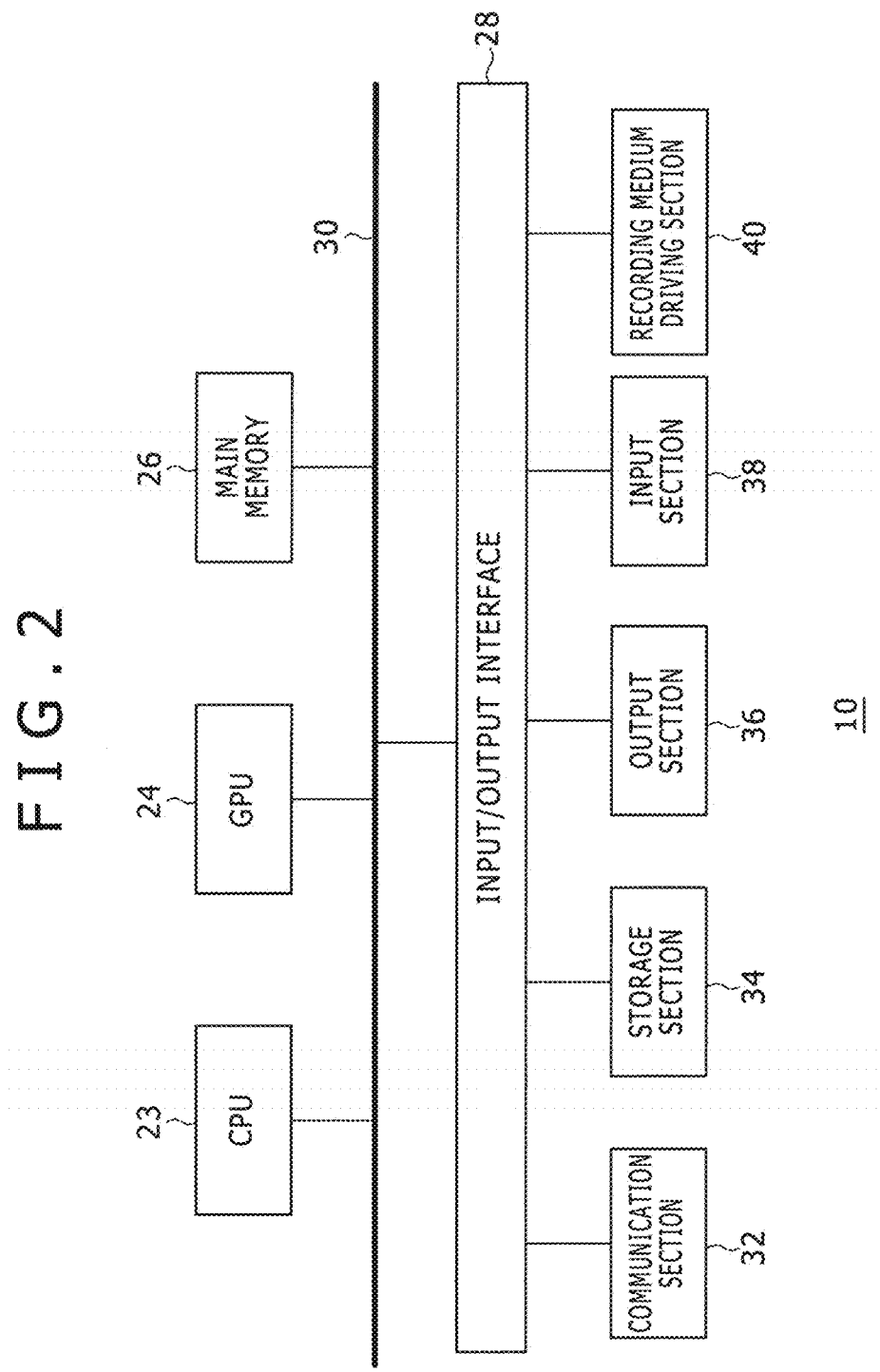
FIG. 2 is a diagram illustrating an internal circuit configuration of an information processing device according to the present embodiment.

FIG. 2 illustrates an internal circuit configuration of the information processing device 10. The information processing device 10 includes a central processing unit (CPU) 23, a graphics processing unit (GPU) 24, and a main memory 26. These sections are connected to each other via a bus 30. An input/output interface 28 is further connected to the bus 30. A communication section 32, a storage section 34, an output section 36, an input section 38, and a recording medium driving section 40 are connected to the input/output interface 28. The communication section 32 includes a peripheral interface such as universal serial bus (USB) or IEEE1394 and a wired or wireless local area network (LAN) interface. The storage section 34 includes a hard disk drive, a non-volatile memory, and so on. The output section 36 outputs data to the display device 16. The input section 38 receives data from the input device 14. The recording medium driving section 40 drives a removable recording medium such as magnetic disk, optical disc, or semiconductor memory.

The CPU 23 runs an operating system stored in the storage section 34, thus controlling the information processing device 10 as a whole. The CPU 23 also runs a variety of programs read from the removable recording medium and loaded into the main memory 16 or downloaded via the communication section 32. On the other hand, the communication section 32 establishes communication with the management server 20 and the content provision servers 22, thus acquiring various data necessary for internal processing tasks and transmitting data indicating details of information entered by users.

The GPU 24 has a geometry engine function and a rendering processor function, performing drawing in accordance with a drawing instruction from the CPU 23 and storing a display image in a frame buffer which is not illustrated. Then, the display image stored in the frame buffer is converted into a video signal and output to the output section 36. The main memory 26 includes a random access memory (RAM) and stores programs and data necessary for processing. It should be noted that the management server 20 and the content provision servers 22 may have the same internal circuit configuration.

Figure 3:
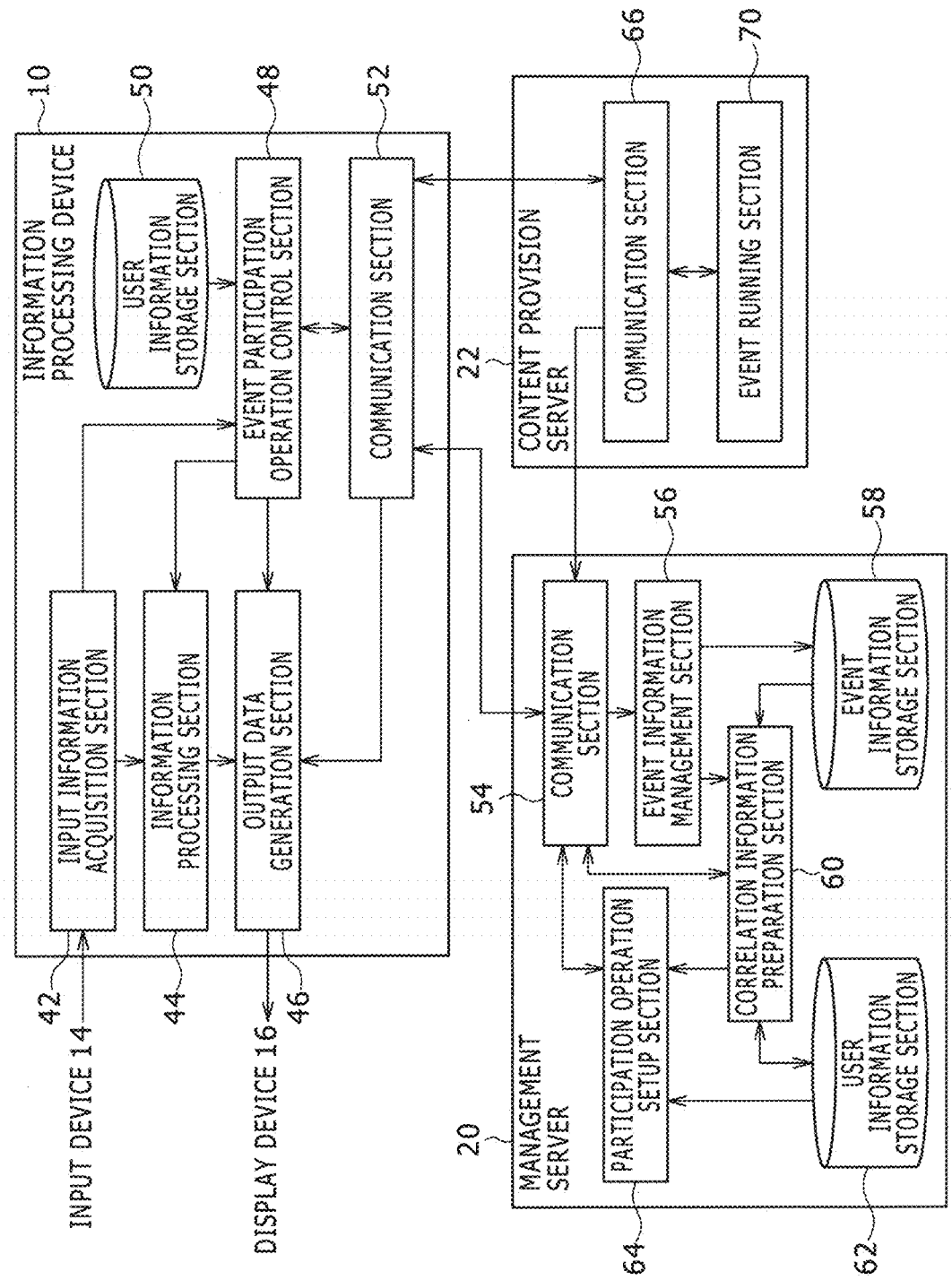
FIG. 3 is a diagram illustrating configurations of functional blocks of an information processing device, a management server, and a content provision server according to the present embodiment.

FIG. 3 illustrates configurations of functional blocks of the information processing device 10, the management server 20, and a content provision server 22. Each of the components illustrated in FIG. 3 as a functional block that handles various processing tasks can be configured, in terms of hardware, by a CPU, a GPU, a main memory, and other large-scale integration (LSI), and, in terms of software, for example, by a program stored in a recording medium or storage device and loaded into a memory, as described above. Therefore, it is understood by those skilled in the art that these functional blocks can be implemented in various ways by hardware alone, software alone, or a combination thereof and that the present disclosure is not limited to any one of them.

The information processing device 10 includes an input information acquisition section 42, an information processing section 44, an output data generation section 46, an event participation operation control section 48, a communication section 52, and a user information storage section 50. The input information acquisition section 42 accepts a user operation via the input device 14. The information processing section 44 performs an information processing task such as game in response to the nature of operation accepted. The output data generation section 46 generates image and audio data to be output. The event participation operation control section 48 controls operations related to events. The communication section 52 establishes communication with the management server 20 and the content provision servers 22, exchanging data therewith. The user information storage section 50 stores various information about a user who operates the information processing device 10.

The input information acquisition section 42 acquires, from the input device 14, a signal representing details of an operation performed by the user such as selection and start or termination of an information processing task such as game, and a command input to the information processing task. The information processing section 44 performs various information processing tasks such as games on the basis of information about details of operations performed by the user acquired by the input information acquisition section 42. The output data generation section 46 generates image or audio data to be output as a result of an information processing task performed by the information processing section 44, causing the data to be output from the display device 16. The output data generation section 46 also draws an image on the basis of data depicting an event list and detailed information thereof, causing the image to be output from the display device 16. Further, if an event to be participated in is video delivery through live streaming (hereinafter referred to as "live delivery"), the output data generation section 46 causes streamed data having transmitted from the content provision server 22 by decoding or the like to be output from the display device 16.

The event participation operation control section 48 requests, to the management server 20, image data that represents an event list and detailed information in response to a user operation. Further, the event participation operation control section 48 monitors the passage of time up to the start date and time of the event in which the user is registered for participation in accordance with the setup from the management server 20, requesting the output data generation section 46 to notify the user at a given time. Further, depending on the user's setup, the event participation operation control section 48 activates the information processing device 10 in sleep state and an application necessary to participate in the event.

Still further, if the event in which the user is registered for participation is a type of event that gives some kind of state change to a game processed by the information processing section 44, the participation operation control section 48 acquires an event parameter to produce the state change, supplying the parameter to the information processing section 44. The parameter in question is transmitted from the content provision server 22 of the event organizer when the event starts. Then, the information processing section 44 progresses the information processing task after reading the parameter, thus bringing about a special change intended by the organizer in a game even if the game has already been purchased and is in regular use by the user.

For example, a possible option would be to give points or a game item only to participants of the event or give them a chance to temporarily move to a special stage. It should be noted, however, that the device that mainly runs the game is not limited to the information processing device 10, and that the content provision servers 22 may mainly run the game. In this case, the user participates in the game in question by operating the input device 14 that is connected to the information processing device 10. The event participation operation control section 48 acquires an authentication identification (ID) for participation in the game first from the management server 20 or the content provision server 22 when the user registers to participate in the event or immediately before the event starts. Then, when the event starts, the user is authenticated for participation in the game by transmitting the authentication ID in question to the content provision server 22.

While the game is run, the event participation operation control section 48 transmits user operation information, acquired from the input information acquisition section 42, to the content provision server 22 as occasion arises via the communication section 52. Then, the output data generation section 46 decodes streamed video data of a game screen reflecting user operation transmitted from the content provision server 22 or draws a video image on the basis of game screen drawing information, outputting streamed data or drawn image on the display device 16.

Such a mechanism makes it possible to provide online games in which a plurality of players participate as events. Hereinafter, such an event that gives a change to part of a game or encourages participation in an online game will be referred to as an "in-game event." However, it is understood by those skilled in the art that an in-game event may be available in a variety of ways and is not limited to that described above. It should be noted that a scheme for issuing the authentication ID and enabling authentication at the time of event participation may be also applied to in-game events other than those for participation in online game and live delivery events.

The user information storage section 50 stores identification information about the user of the information processing device 10. In the present embodiment, even when the single information processing device 10 is shared by a plurality of users, each individual user is put in correlation with events, thus providing event information that matches his or her taste or identifying his or her intention to participate on a user-by-user basis. Therefore, setup in relation to request for provision of information to the management server 20 and time monitoring is correlated with identification information of the user stored in the user information storage section 50 at any time. The communication section 52 is an interface that establishes communication with the management server 20 and the content provision servers 22 and requests for necessary data or acquires the requested data.

The management server 20 includes an event information management section 56, an event information storage section 58, a correlation information preparation section 60, a user information storage section 62, a participation operation setup section 64, and a communication section 54. The event information management section 56 manages event information. The event information storage section 58 stores event information. The correlation information preparation section 60 correlates users with events. The user information storage section 62 stores information that correlates users with events. The participation operation setup section 64 sets up the information processing device 10 in relation to starting events. The communication section 54 establishes communication with the information processing device 10 and the content provision servers 22, exchanging data therewith. The event information management section 56 acquires information about events scheduled to start and image data depicting such information, storing such information and image data in the event information storage section 58.

More specifically, the event information management section 56 acquires given information and data of all information and image data including not only event start schedule, details of the event, target game, identification information of the content provision server 22 that should be accessed by participants at the time of start in the event, information about restrictions on participants by attribute, other related events, and rules for generating authentication IDs for participation in online games but also banners, icons, background images, and other data representing the details of the event. These pieces of data are basically determined, prepared, and entered by an event organizer. The content provision server 22 or the information processing device (not illustrated) connected to the management server 20 accepts input of such pieces of information and transmits them to the management server 20.

If a change is made to an event start schedule that has been stored, the event information management section 56 updates the stored information. The correlation information preparation section 60 correlates the user with the event in accordance with the user operation performed with the information processing device 10. More specifically, the event information management section 56 prepares image data of the event list in a manner desired by the user and correlates a target event with the user in response to participation registration operation. The user information storage section 62 retains, in correlation with identification information of each user, information including identification information of the information processing device 10 used, the event in which the user is registered for participation, the event in which the user participated, and identification information of other user who is registered as a friend.

The participation operation setup section 64 sets up the information processing device 10 such that at least one of the following actions is performed at a given time based on the date and time of the event start in which the user is registered for participation, namely, issuance of a notice to the effect that an event approaches, activation of the information processing device 10, and activation of a necessary application. For example, the participation operation setup section 64 programs a timer including the information processing device 10 and sets up a processing task to be performed at the programmed time. This setup is conducted basically when the user registers for participation using the information processing device 10.

If a change is made to the schedule of the event start afterwards in which the user is registered for participation, the correlation information preparation section 60 acquires that information from the event information management section 56 and notifies the participation operation setup section 64, thus allowing the setup of the information processing device 10 to be corrected by the participation operation setup section 64. Further, if a target event is participation in an online game, at any timing from the registration for participation by users to before the event start, the communication section 54 acquires details of a user operation from the information processing device 10 and transmits, in response thereto, image data for displaying event information and data for setting up an action at the start of the event, an authentication ID used to participate in the game, and other information at a point in time from the registration for participation by users to the start of the event. Further, the communication section 54 acquires information about events scheduled to start and image data displaying those events from the content provision server 22 or the information processing device connected.

The content provision server 22 includes an event running section 70 and a communication section 66. The event running section 70 runs events. The communication section 66 establishes communication with the information processing device 10 and the management server 20, exchanging data therewith. The event running section 70 transmits data to be provided during an event start to the information processing device 10 used by users who register for participation via the communication section 66. Among data provided here is an event parameter that produces a special change to a game processed by the information processing device 10 and streamed data of online game screen and video as described above. When an online game is run, the event running section 70 acquires information related to a user operation from the information processing device 10 via the communication section 66, progresses the game in such a manner as to reflect the user operation, and transmits a game screen in the form of streamed data or drawn screen information.

Streamed video data may be that which is shot, for example, in realtime in an event organizer's studio or in other places such as relayed video of a game played by other player using other information processing device. Thus, live delivery can be conducted in various ways and is not limited to any one of them. Therefore, configurations of necessary functional blocks for live delivery are not illustrated.

Figure 4:
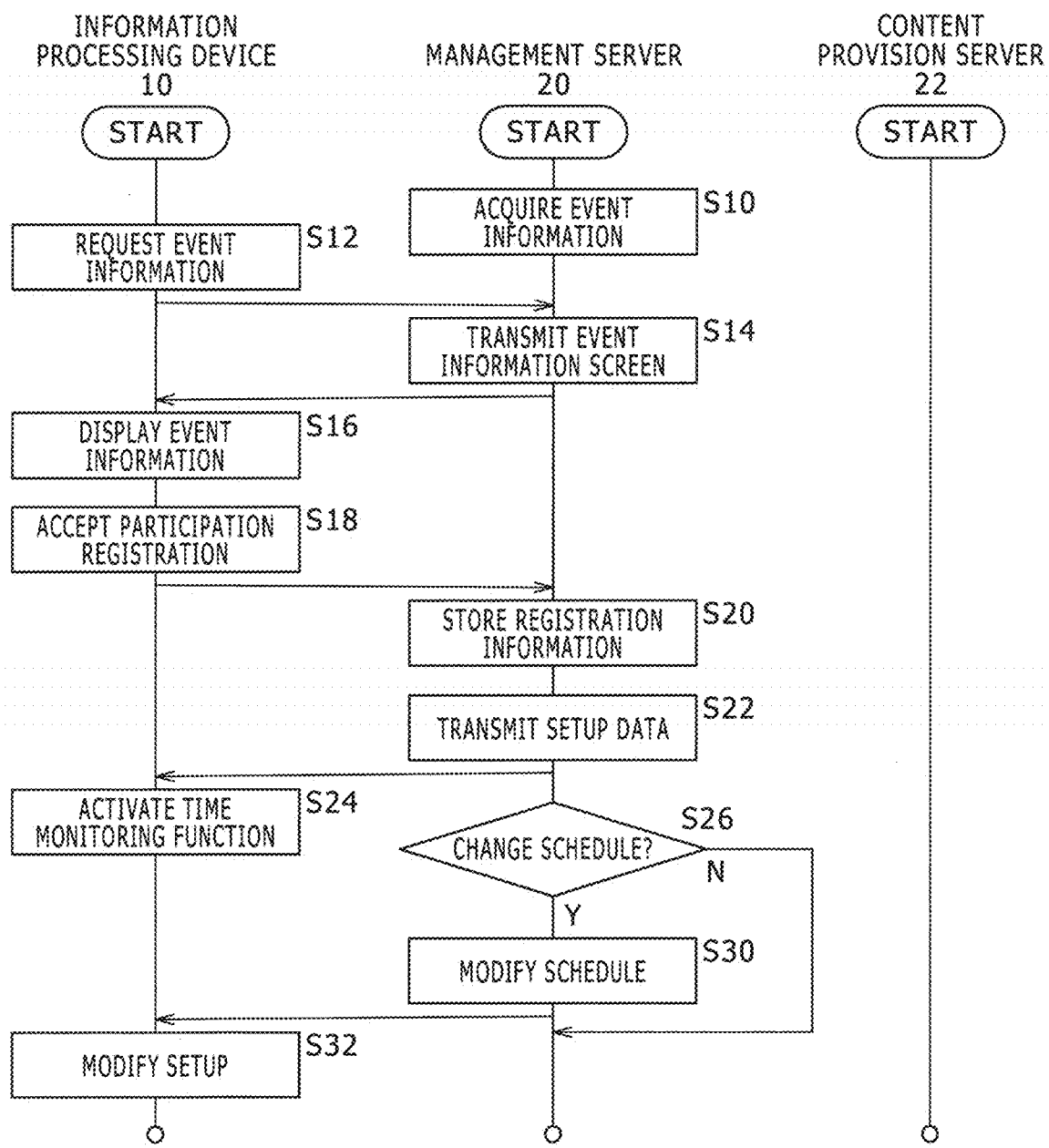
FIG. 4 is a flowchart illustrating steps for the information processing system to present information about an event to be started, accept users' registrations for participation, and perform an operation during the event in the present embodiment.
Figure 5:
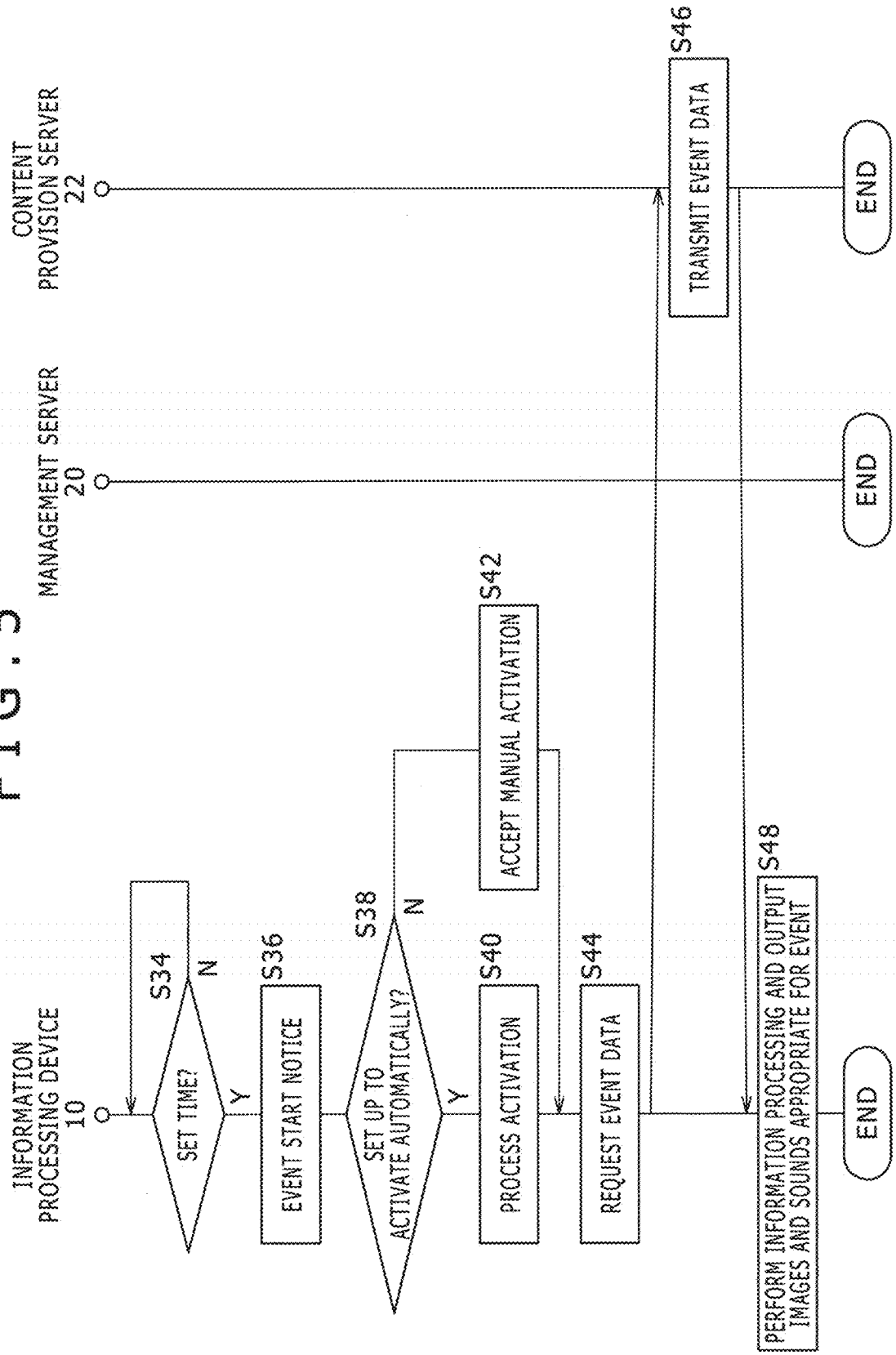
FIG. 5 is a flowchart illustrating steps for the information processing system to present information about an event to be started, accept users' registrations for participation, and perform an operation during the event in the present embodiment.

A description will be given next of operation of the information processing system 1 implemented by the above configuration. FIGS. 4 and 5 are flowcharts illustrating steps for the information processing system 1 to present information about an event to be started, accept users' registrations for participation, and perform an operation at the start of the event in the present embodiment. It should be noted that FIGS. 4 and 5 illustrate only registration for participation in an event from the single information processing device 10 and processing of the registration. However, the management server 20 and the content provision server 22 may handle similar processing tasks for the plurality of information processing devices 10 in parallel in relation to a plurality of events.

Further, FIGS. 4 and 5 illustrate a general flow of steps performed by the information processing system 1 and do not restrict time intervals between the steps. Still further, as will be described later, conditional branches may take place depending on the circumstances. First, in FIG. 4, the management server 20 acquires event-related information and image data from one of the connected devices (S10). This step is performed when an event organizer plans an event, determines its details such as its schedule, and prepares image data as described above.

The event information management section 56 of the management server 20 assigns identification information to acquired data on an event-by-event basis and then stores the data in the event information storage section 58. The information processing device 10 requests information such as a list of events scheduled to start to the management server 20 in accordance with a user operation (S12). This request includes identification information of the user who performed the operation as described above. In response to the request, the correlation information preparation section 60 of the management server 20 acquires information about the user in question from the user information storage section 62, extracting an event that matches a list preparation condition from the event information storage section 58.

Then, the event information management section 56 converts the extracted event information into display image data in a given format and transmits the data to the information processing device 10 (S14). For example, screen configuration data represented in hypertext markup language (HTML) or other format, element image data such as banners, and other data is transmitted as one set. The output data generation section 46 of the information processing device 10 displays event information on the display device 16 using transmitted data (S16). Here, we assume that events displayed in a list are classified by various points of view such as events scheduled to start but in which the user has yet to register for participation, ongoing events, events in which the user is registered for participation, events in which the user participated, recommended events, and events related to games. The event lists can be switched from one to the other.

When the user finds a desired event to be participated from among those whose information is displayed as described above, he or she proceeds with registration for participation via the input device 14. The event participation operation control section 48 of the information processing device 10 accepts input of the registration for participation and notifies the management server 20 to that effect as well as of identification information of the user (S18). The management server 20 correlates the user who is registered for participation with identification information of the event to be participated in, storing the information in the user information storage section 62 as registration information (S20). In response thereto, the participation operation setup section 64 transmits setup data, prepared in such a manner that a given action takes place at the start date and time of the event, to the information processing device 10 (S22).

The event participation operation control section 48 of the information processing device 10 activates its time monitoring function such as timer on the basis of the transmitted setup data (S24). Basically, this condition is maintained until the start date and time of the target event approaches. If the event start schedule is changed during that period (Y in S26), the event information management section 56 of the management server 20 accepts information to that effect from the content provision server 22 or other information processing device connected, modifying the schedule of the event in question stored in the event information storage section 58 and notifying the correlation information preparation section 60 of identification information of the event that has been changed (S30).

The correlation information preparation section 60 extracts the user registered for participation in the event whose schedule has been changed from the registration information stored in the user information storage section 62, requesting the participation operation setup section 64 to modify the setup of the information processing device 10 of the user in question. In response to the request, the participation operation setup section 64 prepares new setup data and transmits the data to the information processing device 10, thus modifying the setup of the information processing device 10 (S32). On the other hand, when the schedule remains unchanged, no modification is made to the schedule (N in S26).

Moving onto FIG. 5, the information processing device 10 waits in an as-is manner until a set time comes for an event in which the user is registered for participation (N in S34). It should be noted that the steps in S30 and S32 in FIG. 4 are performed every time a change is made to the event schedule up to that time. For example, when a set time comes such as a few minutes before the start of the event (Y in S34), the event participation operation control section 48 of the information processing device 10 displays, on the display device 16, an image to notify that the event start time approaches (S36). It should be noted, however, that this is not the case if the information processing device 10 is in sleep mode.

When the information processing device 10 or an application necessary for participation in the event is set up to automatically activate (Y in S38), the event participation operation control section 48 switches the information processing device 10 to normal mode using a function provided by the operating system or requests the information processing section 44 or the output data generation section 46 to activate the application (S40). If the information processing device 10 is not set up to automatically activate (N in S38), the event participation operation control section 48 displays, for example, a screen for activating an application, thus accepting manual activation (S42).

If the event in which the user intends to participate is an in-game event, the application activated in S40 and S42 is a game application or an application that displays an online game screen. If the event in which the user intends to participate is a live delivery event, the application activated in S40 and S42 is an application that displays streamed data. It should be noted that if the application is activated automatically in S40, we assume that an access destination from which to acquire data such as uniform resource locator (URL) of the content provision server 22 is included in the time monitoring setup data transmitted from the management server 20. Further, if the user participates in an online game, we assume that the authentication ID for the game is included in the setup data. Then, the event participation operation control section 48 requests data to be provided in the event to the content provision server 22 (S44). It should be noted, however, that if the user participates in an online game, details of a user operation are transmitted to the content provision server 22 as occasion arises.

In response thereto, the event running section 70 of the content provision server 22 transmits an event parameter or game screen data to the information processing device 10 in the case of an in-game event, and streamed data to the information processing device 10 in the case of live delivery (S46). The information processing device 10 performs an information processing task and outputs images and sounds appropriate to the event using the transmitted data (S48). More specifically, in the case of an in-game event, the transmitted parameter is supplied from the event participation operation control section 48 to the information processing section 44 such that a special change is produced in the game, and then the game progresses by a user operation. In the case of live delivery, the transmitted streamed data is decoded by the output data generation section 46, thus producing images and sounds.

Figure 6:
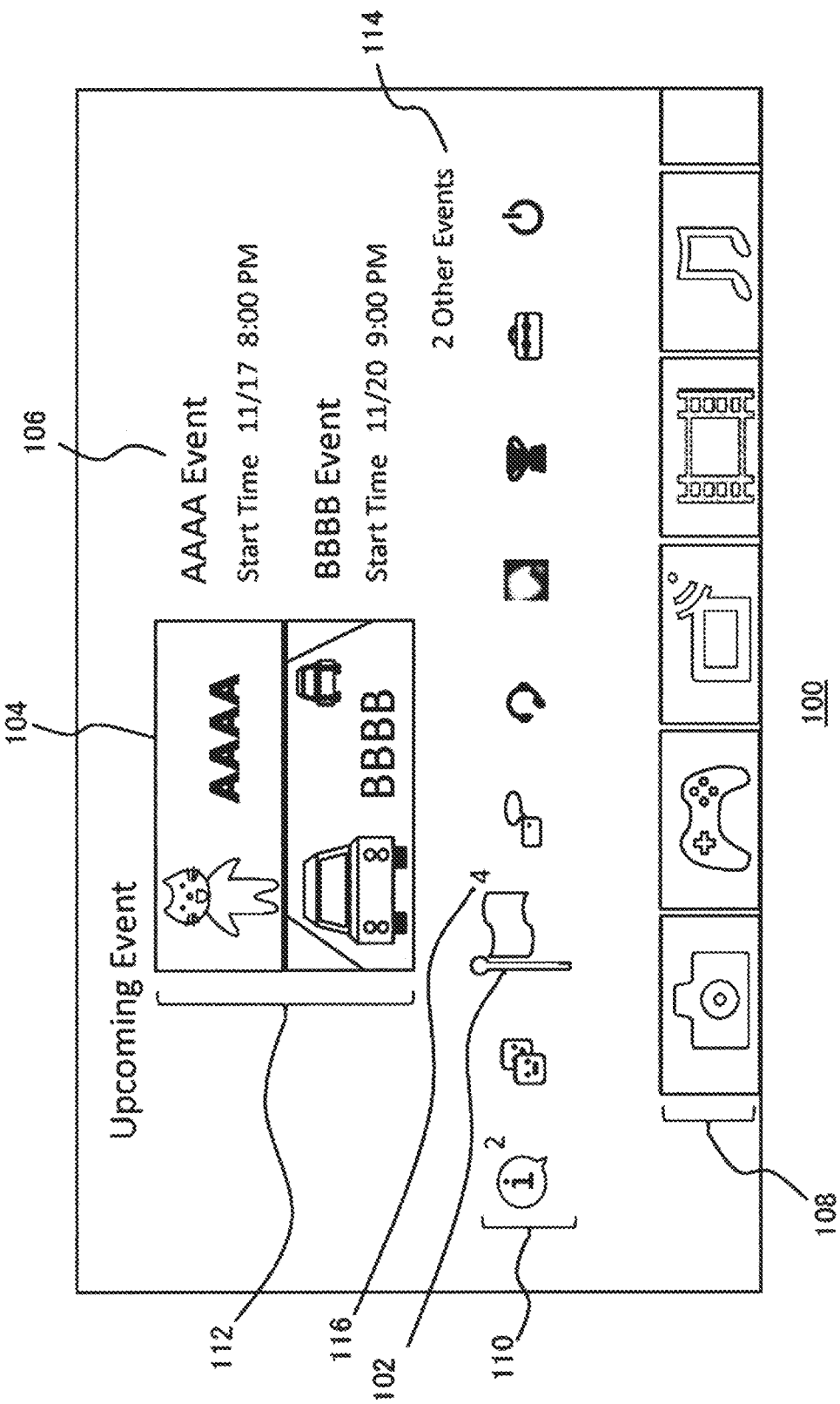
FIG. 6 is a diagram illustrating an example of an event information display screen that is presented as part of a home screen of the information processing device in the present embodiment.

Next, a screen related to participation in an event will be illustrated. This screen is displayed on the display device 16 by the information processing device 10. FIG. 6 illustrates an example of an event information display screen that is presented as part of a home screen of the information processing device 10. This screen 100 serves as an entrance to information that displays in relation to events. We assume that, as a previous step before the screen 100 displays, the user has powered on the information processing device 10, logged into the information processing device 10 by entering his or her user ID and passcode as necessary, and performed a simple operation on the home screen that displays in response to the login.

In this example, an icon group 108 in the screen 100 includes icons of main pieces of content that displayed roughly in the center of an original home screen. As the user presses the up directional key, the icon group 108 moves to the lower edge of the screen and displays there. As a result, other icon group 110 that displayed at the upper edge of the original screen also moves down, displaying in the center and slightly toward the bottom in the screen 100 as illustrated in FIG. 6. The icon group 110 in question represents, for example, information including whether there are any newly arrived news articles supplied from the management server 20 and whether there are any users who are connected to the network 8 at present of all the users who are registered as friends.

When highlighted, for example, by a pointing device, the icon 102 that illustrates event information in the icon group 110 is enlarged, displaying event information in the upper half of the screen 100. In the screen 100, a list of events 112 named "Upcoming Event" is displayed that events in which the user is once registered for participation and that have yet to be started. The event list 112 has an event banner 104 and text information 106 that are arranged side by side for each event. The text information 106 includes an event name and a start date and time of the event. In FIG. 6, two events, i.e., "AAAA Event" and "BBBB Event," are displayed.

If there are three or more events in which the user is registered for participation and that have yet to be started, two thereof are extracted on the basis of a given rule such as in order from earliest to latest start times, with the presence of other events displayed by a given format. In the screen 100, "2 Other Events" are displayed as the text information 114 at the bottom right of the event list 112 to indicate that there are two other events. It should be noted, however, that the number of events that are displayed in the event list 112 is not limited to two. It should be noted that although a list of events that have yet to be started is displayed in the screen 100, those events in which the user is registered for participation and that have already started may be displayed as well, if there are such events.

In the case of an event that lasts for a few months as a campaign for a game and that gives out points to participants as occasion arises, for example, it is likely that one may check ongoing events in the screen in question. In the icon 102 that indicates event information about the icon group 110, the number of events in which the user is registered for participation and that have yet to end is displayed additionally, and in the case of the example illustrated in FIG. 6, "4" appears as a badge number 116. This makes clear how many events are included in the icon 102 before the icon 102 is highlighted.

If no badge number is displayed on the icon 102, this means that there are no events in which the user is registered for participation and that have yet to end. In this case, the area in which the event list 112 is supposed to be displayed may indicate that there are no events in which the user is registered for participation or information that urges the user to participate in events. Of the information displaying in the screen 100, the badge number 116 of the icon 102 and the banner 104 and the text information 106 that make up the event list 112 are displayed by the output data generation section 46. The output data generation section 46 does so by combining registration information prepared by the user when he or she registered for participation and data extracted from the event data provided from the content provision server 22, with the home screen. The registration information and the extracted data are transmitted from the management server 20 to the information processing device 10.

Figure 7:
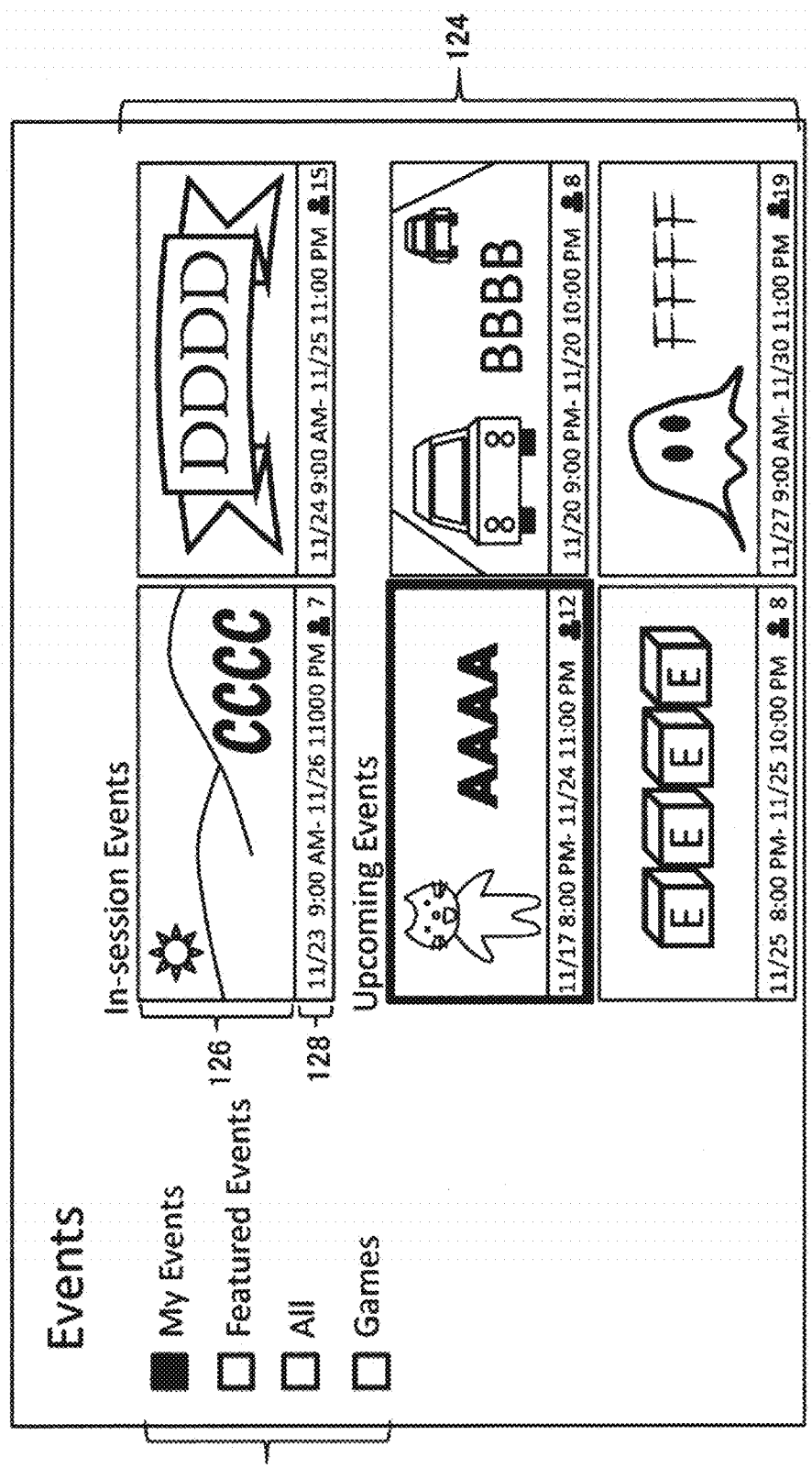
FIG. 7 is a diagram illustrating an example of an event list screen that can be switched to change what displays in the present embodiment.

The screen 100 allows the user to confirm easily whether he or she is registered for participation in any events, the number of such events, schedules thereof, and so on from the home screen of the information processing device 10. This makes it less likely that the user may forget about having registered for events and miss opportunities for participation. FIG. 7 illustrates an example of an event list screen that can be switched to change what displays. A screen 120 is dedicated to events to provide as much information as possible in contrast to the event list illustrated in FIG. 6 that is part of a home screen. The screen 120 displays, for example, when the selection of the icon 102 indicating event information is confirmed in the screen illustrated in FIG. 6.

The screen 120 includes a type selection column 122 and an event list 124. The type selection column 122 allows the user to select a type of events that is displayed in a list. The event list 124 is prepared in accordance with the selected type of events. In this example, four character strings, namely, "My Events," "Featured Events," "All," and "Games," are displayed as event types displayed as options in the type selection column 122. "My Events" indicates events in which the user is registered for participation. "Featured Events" indicates events recommended by the management server 20 of all the events in which the user is not registered for participation. "All" indicates all the events scheduled to start. "Games" indicates a list of games related to the events. Then, when the user selects one of the boxes arranged to the left of the options, a list of events or games that belong to the selected type is displayed in the event list 124.

"My Events" is selected in the screen 120. Therefore, a list of events in which the user is registered for participation is displayed in the event list 124. In FIG. 7, two ongoing events are displayed as "In-session Events," and four events are displayed as "Upcoming Events." If "My Events" is selected, a list of events in which the user was registered for participation and that already ended may be displayed in addition to the above.

Each event is displayed by a banner 126 and text information 128 that are arranged one on top of the other. The text information 128 includes the event start schedule and the number of users registered for participation in the event. Events may be also displayed in the same manner when "Featured Events" that indicates recommended events or "All" that indicates all the events is selected. Although a criterion for extracting recommended events is not specifically limited, the following may be exemplified as such a criterion:

(1) Events for games frequently played by the user
(2) Events in which other user registered as a friend is registered for participation In the case of (1), events are extracted, for example, in order from most recent date and time played of all the games played a given number of times or more such as three times or more, and lists of its in-game events and related live delivery events are displayed. In the case of (2), events are extracted, for example, in order from largest number of friend users registered for participation. The correlation information preparation section 60 of the management server 20 extracts events that meet the criterion on the basis of the information stored in the user information storage section 62 and the event information storage section 58 and transmits the data to the information processing device 10, thus displaying lists.

If (1) is used as a criterion, in the information processing device 10, the management server 20 continuously acquires information about games played by the user, storing the information in the user information storage section 62. Alternatively, the management server 20 may acquire such information from other server that has acquired such information. The extracted events are displayed in the event list 124 in the order that complies with the given rule. Taking the criterion of (1) for example, events are arranged such that the more recent the date and time the target game was played, the higher the event appears in the screen.

It should be noted, however, that if a plurality of events are scheduled to start for the same game, these events are arranged in a scattered manner in the list in question. Alternatively, part thereof may be hidden in consideration of factors such as their durations. This prevents display of recommended events in an uneven manner such as displaying events related to the same game. The criterion for extracting recommended events is not limited to the above. Alternatively, attributes such as event participation registration history, age, sex, and other factors and game play level may be considered. Still alternatively, a plurality of criteria may be used in combination.

If "All" that indicates all the events is selected in the type selection column 122, the user can switch between sorting rules. Further, in this case, events in which the user is registered for participation may be included in the list. Among possible sorting rules are in order from closest start date and time of the event, in order from closest end date and time of the event, and in order from largest number of friend users registered for participation. When events are sorted by start or end date and time, start or end dates and times including those of ongoing events may be displayed for each period on a category-by-category basis, thus allowing the user to verify an event that starts or ends during a desired period with ease.

Figure 8:
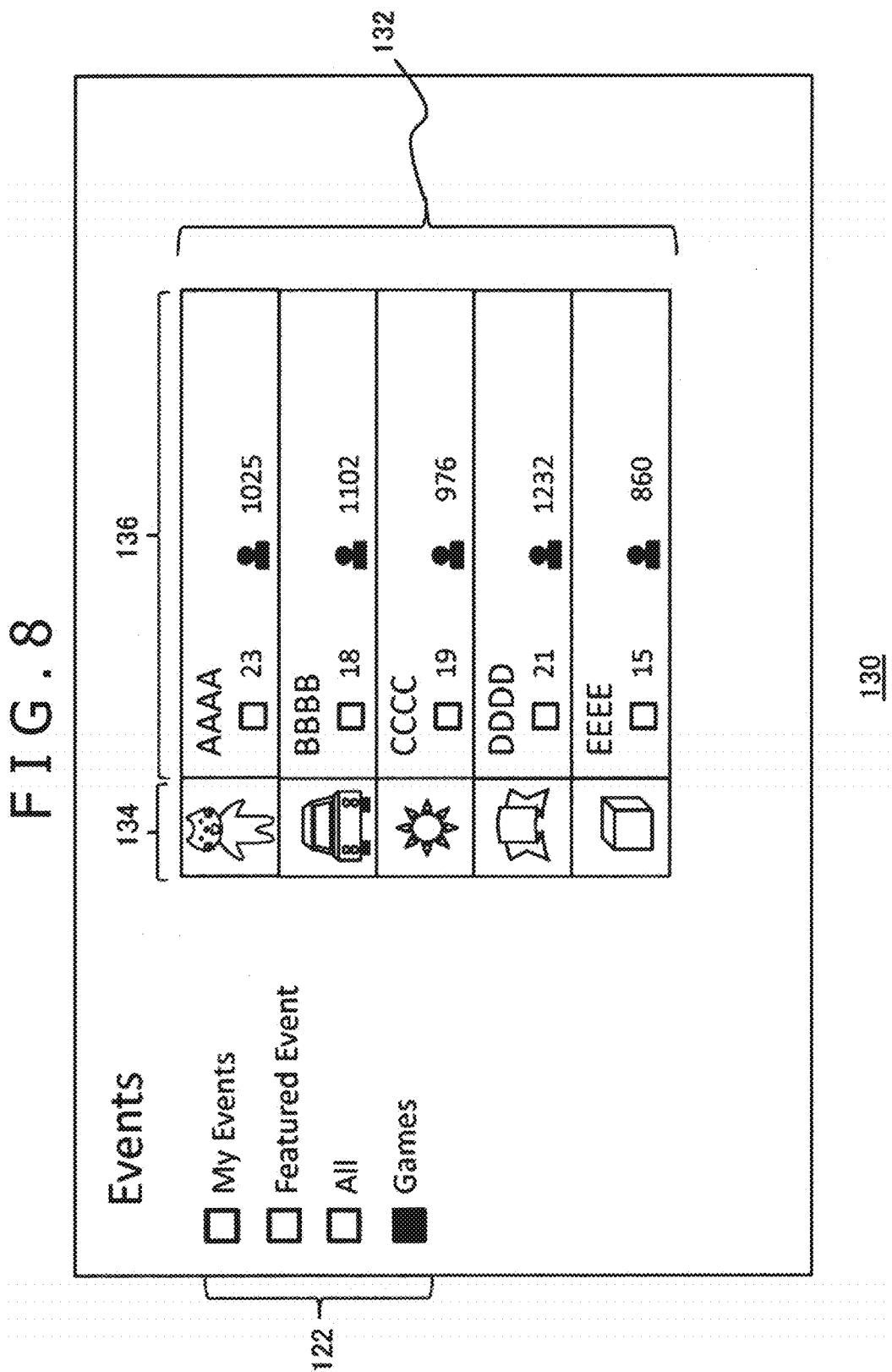
FIG. 8 is a diagram illustrating an example of a screen that appears when "Games" is selected that depicts a list of related games in a type selection column in the event list screen illustrated in FIG. 7.

FIG. 8 illustrates an example of a screen that appears when "Games" is selected that depicts a list of related games in the type selection column 122 in the event list screen 120 illustrated in FIG. 7. In this case, the type selection column 122 in the screen 120 appears in an as-is manner. On the other hand, a game list 132 is displayed rather than the event list 124. The game list 132 is data that organizes events to be started in terms of related games. Each game of the game list 132 includes an icon 134 and text information 136 that are arranged side by side. The text information 136 includes a game (or product) title, number of events scheduled to start in relation to the game in question, and total number of users registered for participation in the events.

It should be noted that the game list 132 permits sorting by a rule selected by the user such as in order from largest number of related events or from largest number of users who are registered for participation. Then, in response to a user operation to select one of the games that appear in the game list 132, an event list related to the game is displayed as does the event list 124 of the screen 120 illustrated in FIG. 7. This makes it possible for the user to narrow down events to display in a list by game of interest.

Operation that selects an option in the type selection column 122 or changes the sorting order is transmitted from the information processing device 10 to the management server 20 one after another. Then, what displays changes as the correlation information preparation section 60 sends back game and event data to be displayed. Games and events to be displayed as an event or game list may be restricted, for example, on the basis of user's nationality, age, or a combination thereof. Such restriction information is determined by an event organizer or game creation company and transmitted from the content provision server 22 to the management server 20 as additional event and game information.

The management server 20 acquires the nationality and age of the user of the information processing device 10 from the user information storage section 62 and compares the information against restriction information, hiding events and games that should be excluded from the list if any. This avoids inconvenience such as inclusion of events and games inappropriate for children in consideration of factors that depend on the nationality such as difference in age restrictions. Further, it is possible to make an event distinctive by restricting attributes, albeit appropriate, of users who are allowed to participate.

Figure 9:
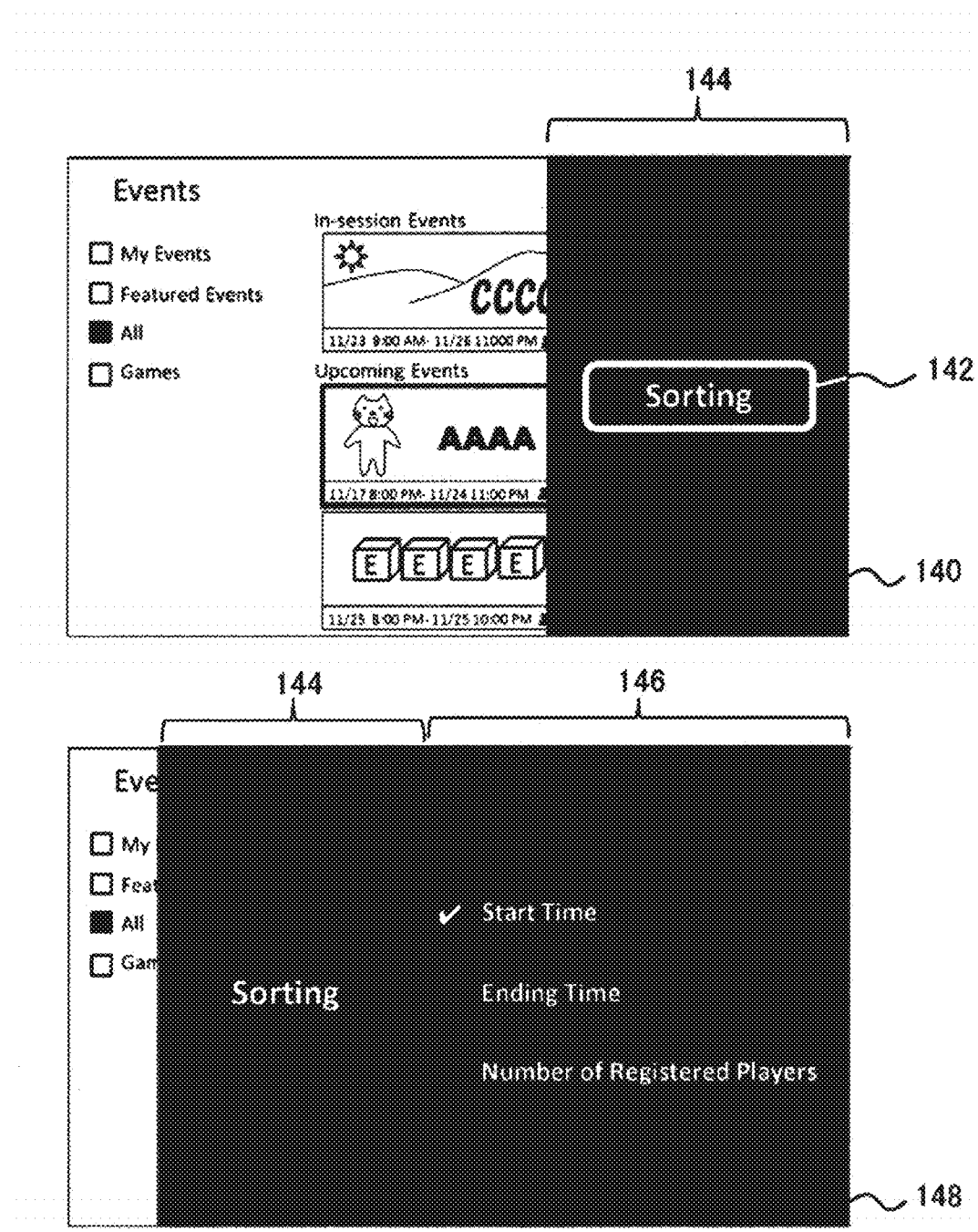
FIG. 9 is a diagram illustrating an example of a screen that accepts switching between sorting rules for the event list as an optional operation in the present embodiment.

A change to the sorting rule is accepted, for example, by operation to select an "optional operations" user interface (UI) that appears as a footer in the screens 120 and 130 at a given time. The sorting rule may also be changed by pressing a given button for "optional operations" on the input device 14. FIG. 9 illustrates an example of a screen that accepts a change to a sorting rule for the event list as an optional operation. This example illustrates that "optional operations" is selected when "All" that indicates all the events is selected in the event list screen as illustrated in FIG. 7.

At this time, an area 144 for displaying choices of optional operations appears such that the area 144 spreads from the right edge of the event list screen in question (screen 140). In the example of FIG. 9, the area 144 appears as a translucent filled-in area such that it overlays the original screen. Further, in this case, "Sorting," text information 142 that represents a change to the sorting rule, is displayed as the only choice. Here, if the user highlights the text information 142 and confirms the selection, for example, with a pointing device, the area 144 for displaying the choices of optional operations is moved to the left, and at the same time, an area 146 for displaying sorting rule choices appears in such a manner as to spread from the right edge of the screen (screen 148).

In the example of FIG. 9, three choices are displayed, namely, "Start Time" that represents the start time of the event, "Ending Time" that represents the end time, and "Number of Registered Players" that represents the number of users registered for participation. Here, if the user confirms the selection by placing a checkmark in one of the choices, the areas 144 and 146 are hidden to display an event list that has been sorted by a selected rule.

Figure 10:
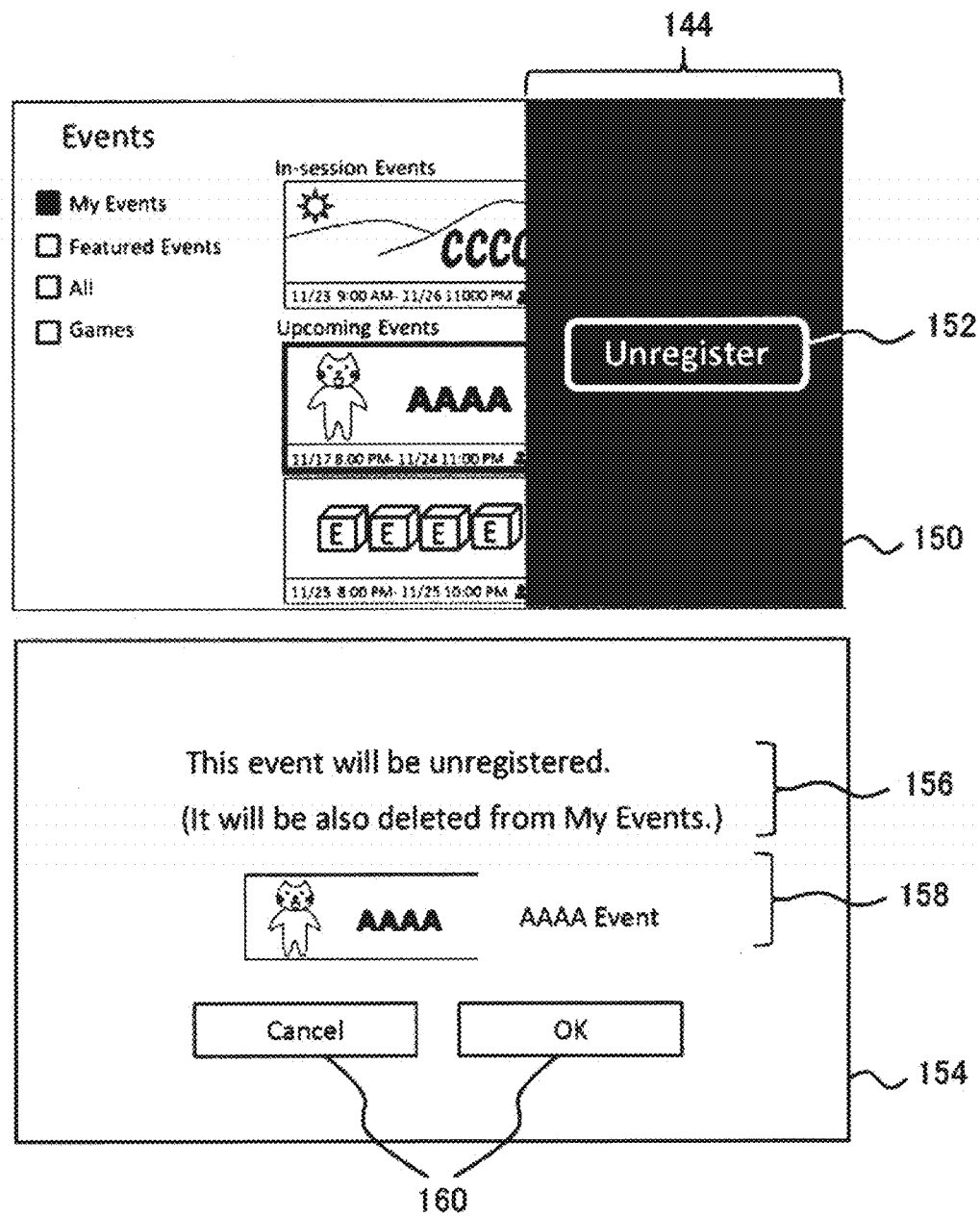
FIG. 10 is a diagram illustrating an example of a screen that accepts an operation to cancel registration for participation in an event that is already set as one of the optional operations in the present embodiment.

FIG. 10 illustrates an example of a screen that accepts an operation to cancel registration for participation in an event that is already set as a choice of "optional operations." This example illustrates a case in which when "My Events" is selected in the type selection column 122 as in the event list screen 120 illustrated in FIG. 7, a list of events is displayed in which the user is registered for participation, and in which "optional operations" is selected with one of the events of the event list highlighted.

At this time, the area 144 for displaying choices of optional operations appears such that the area 144 spreads from the right edge of the event list screen in question (screen 150) as when the sorting rule is changed as illustrated in FIG. 9. In this case, "Unregister," text information 152 that represents a cancellation of the registration, is displayed as the only choice. Here, if the user highlights the text information 152 and confirms the selection, for example, what displays changes to a confirmation screen 154 for registration cancellation. The confirmation screen 154 includes a screen description 156, information 158 about a target event whose registration is to be cancelled, and confirm/cancel buttons 160 for registration cancellation.

The screen description 156 is a statement saying that the screen is used to cancel the registration and that the event in question will be excluded from the "My Events" event list. The registration cancellation target event information 158 includes a banner and an event title. However, the registration cancellation target event information 158 may also additionally display an event start schedule. The user checks the screen description 156 and the registration cancellation target event information 158. When the user wishes to proceed, he or she presses the "OK" button of the confirm/cancel buttons 160. If the user does not wish to cancel the registration, he or she presses the "Cancel" button. In both cases, what displays changes back to the original event list. However, when the user cancels the registration, the target event will be excluded from the "My Events" event list.

On the other hand, the event participation operation control section 48 of the information processing device 10 notifies the management server 20 that the participation registration has been cancelled. The correlation information preparation section 60 of the management server 20 extracts registration information of the user in question from the registration information stored in the user information storage section 62, updating the information by deleting the registration for the target event.

Figure 11:
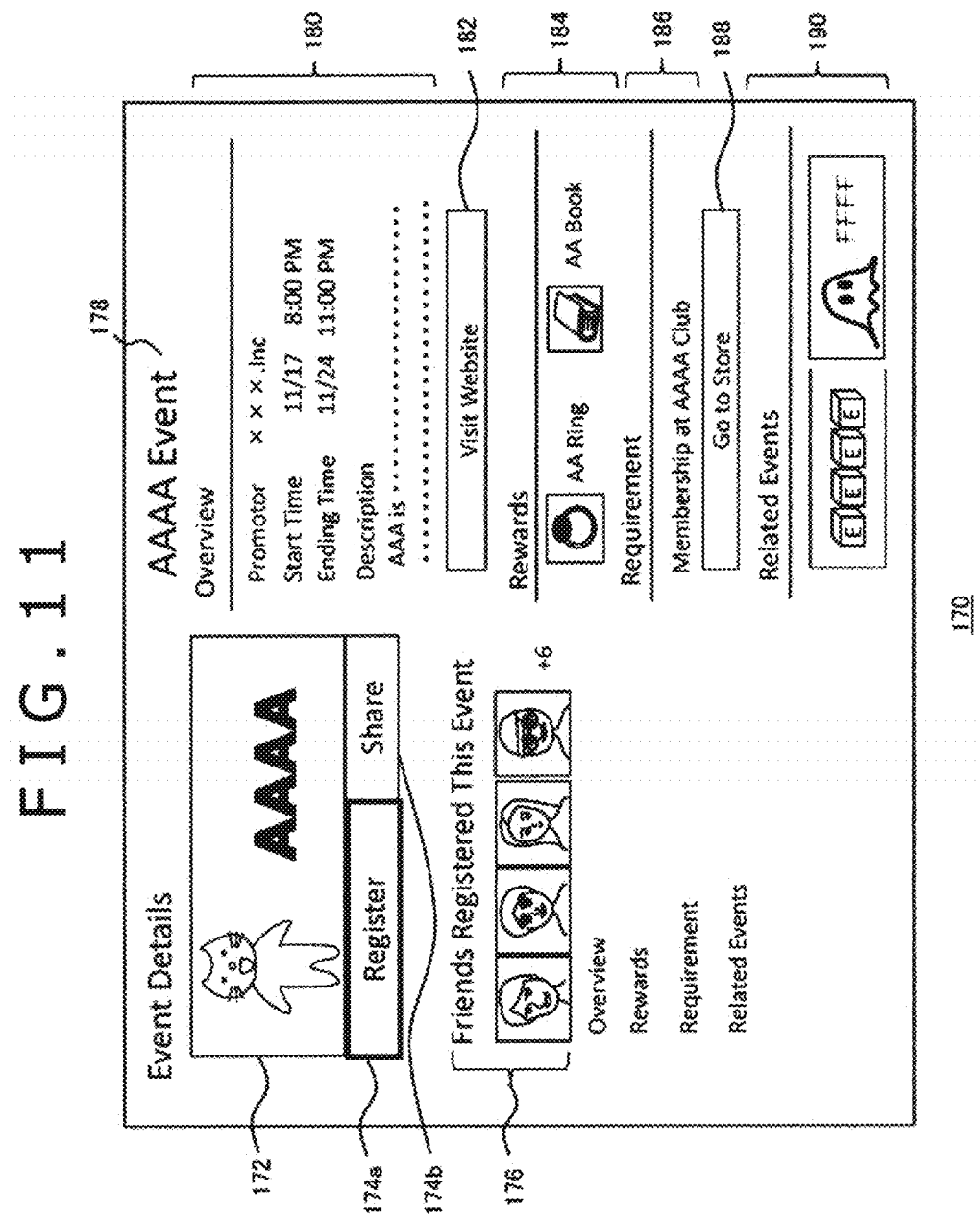
FIG. 11 is a diagram illustrating an example of a screen that displays details of an event as an event-dedicated screen in the present embodiment.

FIG. 11 illustrates an example of a screen that displays details of an event as an event-dedicated screen. This screen is, for example, an event-by-event screen that is displayed when an event is selected from the event list 124 in the event list screen as illustrated in FIG. 7. A screen 170 includes a banner 172, an event title 178, an event outline 180, friend user information 176, reward information 184, a qualification for participation 186, and a related event list 190.

The screen 170 further includes UIs such as operation buttons 174a and 174b for the target event, a button 182 to display an official site webpage and a button 188 to display a webpage of a virtual store site where one can purchase a qualification for participation and necessary items. The banner 172 may be the same as that which displays, for example, in the event list screen. The event outline 180 includes an organizer's name, start and end dates and times, details of the event, and so on. If the user wishes to learn more about the details of the event, he or she displays the official site webpage by operating the button 182, thus allowing for easy understanding of detailed information.

The friend user information 176 displays a row of icons such as facial photos of users already registered for participation in the target event among all users who have registered as friends. If icons cannot be displayed within the given area, the number of hidden users is indicated by a number such that when operated by the user, the row of icons stretches to check the icons of all the users. Making it possible to check friend users registered for participation gives a chance to become interested in the event in question and reduces psychological barriers against participation in the event. The reward information 184 indicates, by icons and text information, items, points, qualifications, and so on that can be acquired in the game by participating in the event.

The qualification for participation 186 displays, by text information, for example, a qualification necessary for participating in the event. Among qualifications that could be set up are becoming a member of the game in question in advance, reaching a given level of the game or higher, and purchasing game's application software. If the user wishes to purchase things that are necessary to receive a qualification for participation, he or she can do so with ease by operating the button 188 and displaying the webpage of the virtual store. The related event list 190 is a list of events that are closely related to other events for the same game. In the case of FIG. 11, such an event is displayed by a banner.

The operation buttons 174a and 174b for the target event are designed to accept user operations on the event appearing in the screen that are permitted at that time. In the example illustrated in FIG. 11, the user is not registered for participation in the target event. Therefore, two buttons, i.e., the "Register" button 174a and the "Share" button 174b, appear. The "Register" button 174a allows the user to register for participation. The "Share" button 174b allows the user to share event information with other users, for example, through SNS. Possible operations are switched depending not only on whether the user is already registered for participation in the event in question but also on whether the event in question has yet to start, is in progress, or ended. The following indicates an example of case classification.

TABLE 1

|  | Before event | Event in progress | After event |
|---|---|---|---|
| Not registered |  | Register |  |
|  |  | Share |  |
|  |  | View participant's broadcasting |  |
| Registered |  | Cancel registration |  |
|  |  | Share |  |
|  |  | Participate |  |
|  |  | View participant's broadcasting |  |

That is, if the user is not registered for participation, and when the event has not started or is in progress, the button 174a to register for participation and the button 174b to share through SNS are displayed. The button 174b to share through SNS is displayed regardless of whether the user is registered for participation and whether the event has not started, is in progress, or ended. If the button 174b to share is operated, a screen appears to select SNS as a sharing unit. Then, event information can be shared with other users with ease by setting up a link to the event details screen, for example, on an SNS screen that appears in response to the selection operation.

Further, during the event, a button appears to view a video that is delivered live to show other users who are participating in the event irrespective of whether the user is registered for participation. This video is, for example, a game screen played by other user who has participated in an in-game event and relayed or delivered by the content provision server 22 or the management server 20. It should be noted that this is not the case if other participant is not engaged in such broadcasting.

Still further, when the user is already registered for participation in the target event, a button to cancel the registration appears rather than the button 174a to register for participation illustrated in FIG. 11. That is, the user can cancel the registration from the event list screen as illustrated in FIG. 7. Alternatively, the user can do so from the details screen illustrated in FIG. 11. Further, when the user is already registered for participation, and if the event is in progress, a button also appears to participate in the target event immediately. If this button is operated, the application is activated in the information processing device 10 as appropriate as illustrated in S42 to S48 in FIG. 5, initiating game processing or displaying a video using a parameter and streamed data transmitted from the content provision server 22.

It should be noted that the above case classification is merely an example and that the buttons that appear may also be changed in accordance with the event type, its details, and varying circumstances. In the case of a live delivery event, for example, a button to view a video that is delivered live by other participant is hidden. Further, a button for registration or participation is hidden if the number of participants reaches its upper limit. Thus, if only UIs for acceptable operations are displayed in accordance with circumstances, the screen configuration remains simple and makes it easy to understand operations.

Of the screen 170, the banner 172, the event title 178, the event outline 180, the reward information 184, the qualification for participation 186, the related event list 190, link destination information when the buttons 182 and 188 are operated, background image data of the screen 170, and so on are prepared and decided by the event organizer. Such information is acquired by the management server 20 from the content provision server 22 or other information processing device connected and stored in the event information storage section 58.

Then, when the user requests the information processing device 10 to display an event details screen, the screen is transmitted from the management server 20 to the information processing device 10 together with other information, thus allowing the screen 170 to be displayed. It should be noted that the screen 170 is designed by assuming that an in-line game event appears. In the case of a video delivered live, the screen 170 may be basically configured in the same manner. However, unnecessary information such as the reward information 184 and the qualification for participation 186 may be excluded from what appears. Instead, information about video broadcasting service used may be presented.

Figure 12:
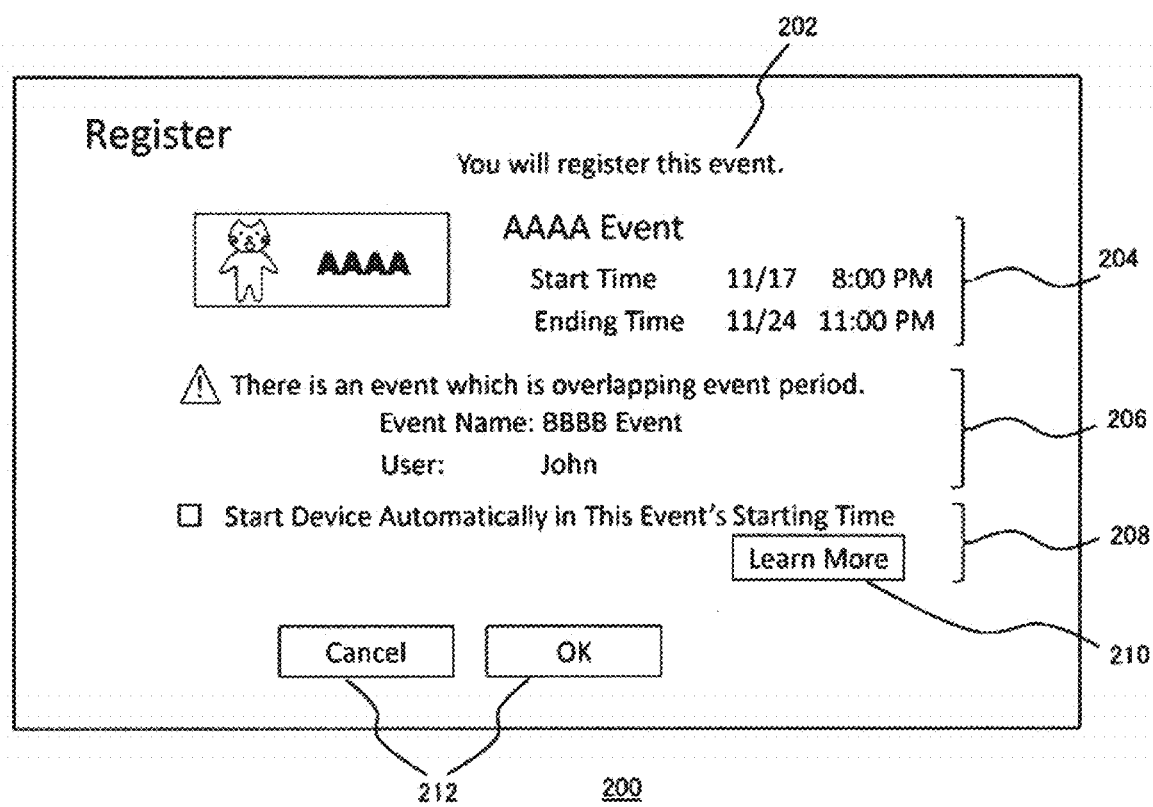
FIG. 12 is a diagram illustrating an example of a screen that accepts registration for participation in an event as an event-dedicated screen in the present embodiment.

FIG. 12 illustrates an example of a screen that accepts registration for participation in an event as an event-dedicated screen. This screen is displayed, for example, when the button 174a is operated that represents registration for participation in the event details screen illustrated in FIG. 11. A screen 200 includes a screen description 202, information 204 about an event for which to register, a warning message 206, an auto-activation setup column 208, and confirm/cancel buttons 212 for registration. The screen description 202 is a statement that says that the screen is used to register for participation in the event. The information 204 about an event for which to register includes information including banner, event title, and schedule.

The warning message 206 gives a warning if the duration of the event in which the user intends to register for participation at least partially overlaps that of other event in which the user of the same information processing device 10 is already registered for participation. In the example illustrated in FIG. 12, the warning message 206 states, in the form of text information, that the duration of an event overlaps that of the event in which the user intends to register for participation, and displays the event title and the name of the user registered for participation. Here, the term "user registered for participation" refers naturally to the user himself or herself when the user's account is the only account registered in the information processing device 10. If a plurality of user accounts are registered, the term may refer to other user such as a family member in addition to the user himself or herself.

If the warning message 206 is displayed, the user can take one of the following actions: cancelling his or her registration, registering for now and cancelling one of the registered events later, and not participating in one of the events. When the duration of the event targeted for registration does not overlap those of other events, the warning message 206 does not appear. The auto-activation setup column 208 is designed to accept automatic activation of the information processing device 10 or an application at the start of the event targeted for registration if so desired by the user. The user wishing to automatically activate the information processing device 10 or an application places a checkmark in the checkbox to the left of the auto-activation setup column 208, for example, by pointing to the checkbox.

A "Learn More" button 210 is provided in the auto-activation setup column 208 to request detailed explanation about automatic activation. When the button 210 is operated, what displays changes to a screen (not illustrated) that displays text information as to how to proceed with automatic activation and an activation policy. A detailed description will be given later of automatic activation. The user checks what displays and operates the OK button of the confirm/cancel buttons 212 when there is no problem and the Cancel button if he or she wishes to stop proceeding with registration. When the user registers for participation, this information is notified to the management server 20. As a result, the correlation information preparation section 60 correlates user identification information and the event targeted for registration, storing this information in the user information storage section 62 as registration information.

In response, the participation operation setup section 64 transmits setup data to the information processing device 10 such that an activation process is performed at a given time relative to a start time of the event targeted for participation. It should be noted that if the registration process is performed, and when other user registered as a friend attempts to display the details screen of the same event on his or her own information processing device 10, an icon of the user himself or herself appears in the friend user information 176. Therefore, a statement that gives a warning to that effect may be additionally displayed in the participation registration acceptance screen illustrated in FIG. 12. What displays on the information processing device 10 switches back to the original event details screen irrespective of which of the confirm/cancel buttons 212 is operated.

It should be noted, however, that if automatic activation is set up, a control screen may be displayed that explains about a state necessary to automatically activate the information processing device 10, e.g., sleep mode, or to bring the information processing device 10 into that state. It should be noted that automatic activation can be set up or cancelled separately from registration for participation. For example, setup for automatic activation is changed by highlighting a target event in the "My Events" event list in the event list screen as illustrated in FIG. 7 or selecting "optional operations" that is displayed as a footer in the details screen of the target event illustrated in FIG. 11. In this case, the screen that appears may have approximately the same configuration as the control screen for cancelling participation registration.

As described above, if a change is made to an event schedule during a period from registration for participation to the start of the event, the management server 20 acquires the information in question from the content provision server 22, notifying the information processing device 10 and modifying time setting for automatic activation. At this time, the management server 20 also notifies the user that the schedule has been changed. For example, the presence of a notice is displayed by a badge number in the home screen illustrated in FIG. 6, and the user can find that the schedule has been changed by opening a notice list screen through a given operation.

If a link to the details screen of the event to be changed is set up in the notice, the user can readily take an action in response to a change such as cancelling registration for participation. In addition to a change to the schedule, the user is similarly notified when the event itself is cancelled. If the registration for participation is cancelled or the event itself is cancelled, the management server 20 modifies registration information stored therein and transmits, to the information processing device 10, information to the effect that, of the time monitoring setups on the information processing device 10, that for the event in question will be cancelled. When receiving this information, the information processing device 10 cancels the setup for the event in question.

Figure 13:
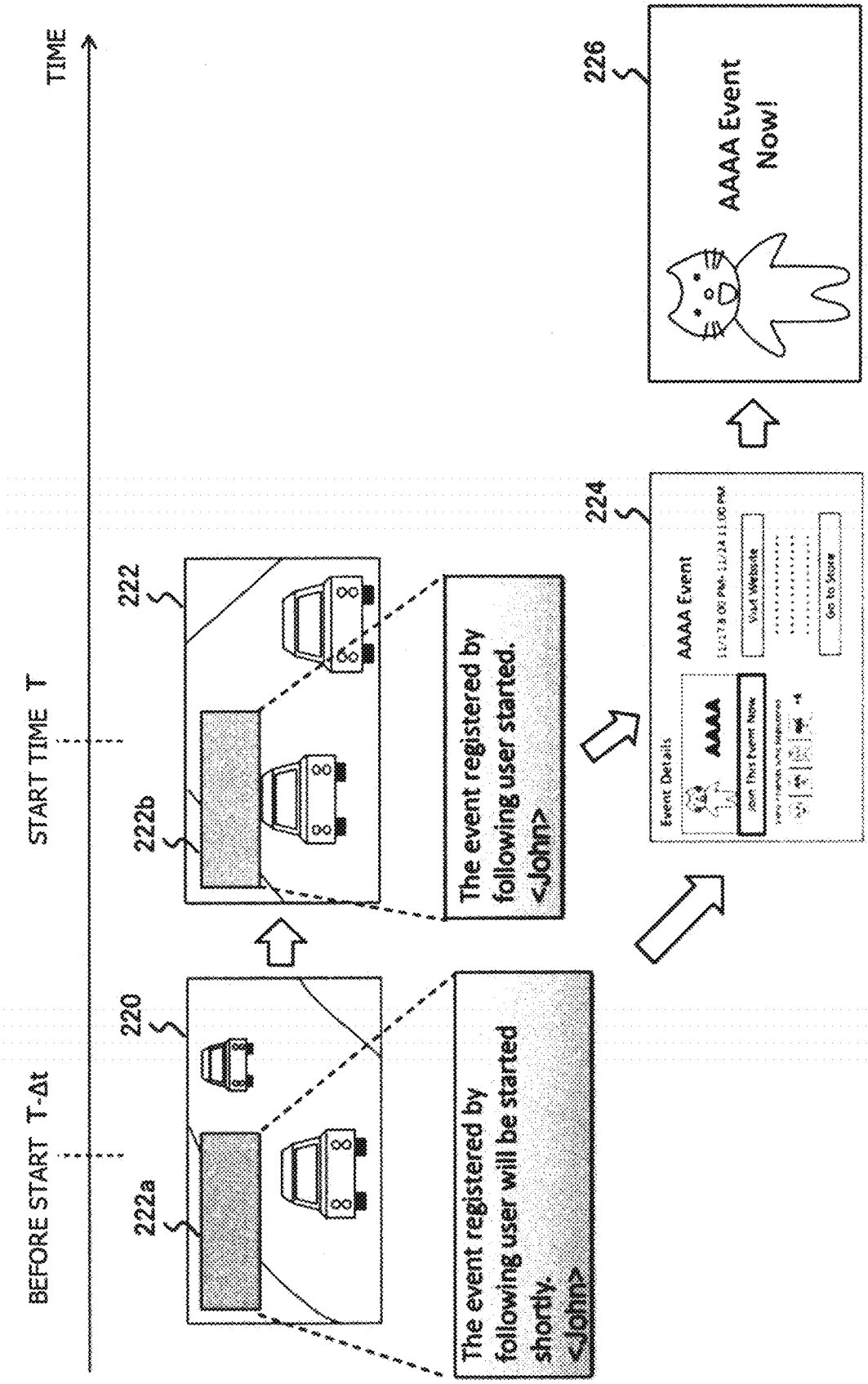
FIG. 13 is a diagram illustrating an example of a transition between screens that appear on the information processing device when an event for which automatic activation is not set up starts in the present embodiment.

A description will be given next of notification to the user and an automatic activation process when an event starts. FIG. 13 illustrates an example of a transition between screens that appear on the information processing device 10 when an event for which automatic activation is not set up starts. In this example, we assume that the user plays a racing game or other game outside the event. It should be noted, however, that as long as the information processing device 10 is active, the details of the process performed by the information processing device are not limited, and that the home screen may remain on display.

Then, when the time monitoring function set up in advance by the management server 20 detects that the time a given time $\Delta t$ prior to the start time T of the event in which the user is registered for participation comes, the event participation operation control section 48 of the information processing device 10 displays a message window 222a indicating that the event start time approaches such that the message window 222a overlays a display screen 220 at that time. In the example illustrated in FIG. 13, a sentence and "John," the name of the user registered for participation, are displayed in an enlarged manner under the display screen 220. The sentence says that the start time of the event in which the user is registered for participation approaches. It should be noted that the given time $\Delta t$ is, for example, one minute.

When the user performs an operation to display an event details screen 224 by operating the information processing device 10, a target game or video display application activates under control of the event participation operation control section 48, switching what displays to a screen 226 that matches the event. At the same time, the event participation operation control section 48 requests transmission of data necessary for the event to the content provision server 22 that has identification information set up in correlation with the event details screen 224.

In response, in the case of an in-game event, an event parameter or online game screen data is transmitted from the content provision server 22, and in the case of a live delivery event, streamed data is transmitted therefrom. On the other hand, if the user continues to play the original racing game without performing any operation to switch to the event details screen 224 even when the message window 222a indicating that the event start time approaches appears, a message window 220b indicating that the event start time has come at an event start time T will be displayed such that the message window 220b overlays a display screen 222 at that time.

The user performs an operation to display the event details screen 224 and participate in the event, for example, when the racing game he or she played ends. As a result, a target game or video display application activates, switching what displays to the screen 226 that matches the event, as in the above case. It should be noted, however, that the time when the user performs an operation to display the event details screen 224 and participate in an event is not limited thereto. Depending on the duration and details of the event, the user may perform an operation at a desired later time. In any case, notifying the user as illustrated in FIG. 13 makes the user aware that the event in which he or she is registered for participation starts.

It should be noted that we assume that "John," a user registered for participation, is using the information processing device 10 before the start of the event in the example illustrated in FIG. 13. However, if a user other than "John" is using the information processing device 10, an operation to participate is accepted only when "John," the user registered for participation, relogs in. Further, the management server 20 may make the user aware by transmitting a message (reminder about the start of the event) to that effect with a longer time scale than for displaying the message window 222a such as one hour prior to the start of the event in which the user is registered for participation. This message is similarly notified when automatic activation is set up.

Figure 14:
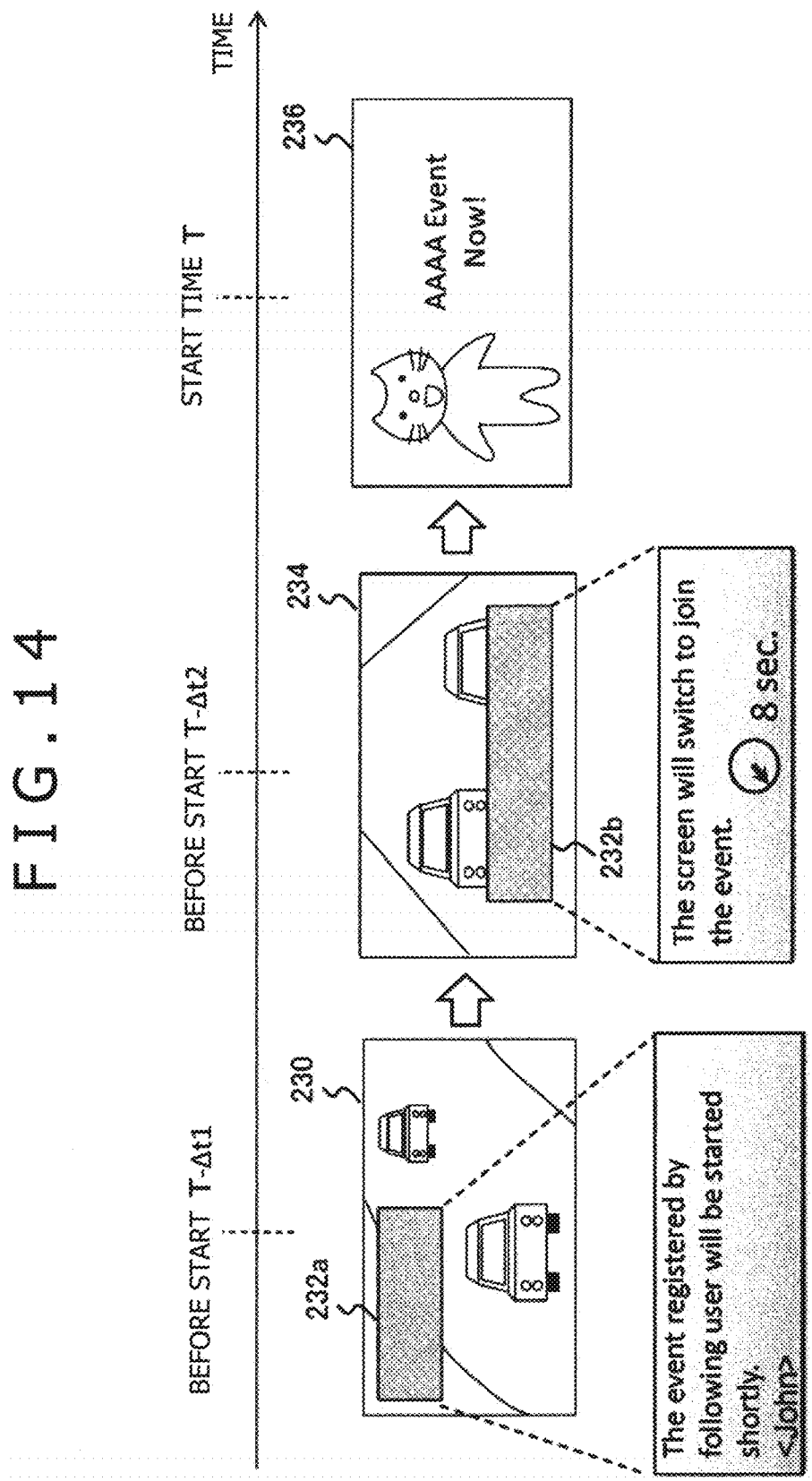
FIG. 14 is a diagram illustrating an example of a transition between screens that appear on the information processing device when an event for which automatic activation is set up starts in the present embodiment.

FIG. 14 illustrates an example of a transition between screens that appear on the information processing device 10 when an event for which automatic activation is set up starts. In this example, we assume that the user plays a racing game or other game outside the event. However, this assumption does not limited to this as in the case of the example illustrated in FIG. 13. In particular, when automatic activation is set up, the information processing device itself may be in a standby state (sleep mode) with its processing functionality disabled. A description will be given later of the manner in which the information processing device recovers from sleep mode. In the example illustrated, as with the example illustrated in FIG. 13, when it is detected that the time a given time Δt1 prior to the event start time T comes, the event participation operation control section 48 of the information processing device 10 displays a message window 232a indicating that the event start time approaches such that the message window 232a overlays a display screen 230 at that time.

What displays on the message window 232a may be the same as that in FIG. 13 as displayed under the display screen 230 in an enlarged manner. Here, the given time Δt1 is, for example, one minute. Next, when it is detected that the time a given time Δt2 prior to the event start time T comes, the event participation operation control section 48 displays a message window 232b indicating a countdown before automatically switching what displays to an event screen such that the message window 232b overlays a display screen 234 at that time. Here, the given time Δt2 is shorter than the given time Δt1 or, for example, 15 seconds.

During the period of time from after the first message window 232a is displayed until the next message window 232b is displayed, the original message window 232a may remain on screen. Alternatively, the message window 232a may disappear in a given period of time. The message window 232b displays a countdown number indicating a time remaining in seconds until the screen changes and a clock as illustrated in an enlarged manner under the display screen 234. Then, when the start time T comes, a target game or video display application activates under control of the event participation operation control section 48, and necessary data is acquired from the content provision server 22. As a result, what displays changes to a screen 236 that matches the event.

It should be noted that even if set up, automatic activation may be cancelled by accepting a given cancellation operation or a logout operation by a user registered for participation when the message window 232a or 232b appears. In this case, what displays is switched back to the original racing game screen rather than displaying the screen 236. It should be noted that although the example illustrated in FIG. 14 indicates an example of a transition between screens when automatic activation is set up, a variety of patterns are actually possible in accordance with circumstances at that time.

For example, the most appropriate and most reasonable operation is set up in accordance with a case classification as described above such as whether the information processing device 10 is in sleep mode, whether the user registered for participation is logged in, whether entry of a passcode is necessary for login, whether the game played immediately before the in-game event is the same as the game for which the event is organized, and whether the user who was playing using the information processing device 10 immediately before the start is the same as or different from the user registered for participation in the event.

In consideration of the classification described above, FIG. 15 illustrates an example of steps for the information processing device 10 of the user who is registered for participation in an event to activate automatically. This process begins a given time Δt3 prior to the start time of the event. Here, the given time Δt3 is, for example, one minute. First, when the information processing device 10 is in sleep mode (Y in S100), a resume process switches the information processing device 10 to normal mode (S102). Such switching can be achieved by a common technique by using one of the functions of the operating system that runs in the information processing device 10.

If the information processing device 10 is not in sleep mode, that is, if it is in normal mode, the resume process is omitted (N in S100). Next, if the user registered for participation in the target event is not logged in and if no login passcode is set up for the user (N in S104 and N in S106), the information processing device 10 itself proceeds with a login process (S108). This process may be a common login process that reads setup information of the user from a storage device and assigning a memory. It should be noted, however, that if the number of logged-in users has already reached an upper limit for number of users allowed to be simultaneously logged into the information processing device 10 at that time, the user who has registered for participation cannot log in.

In this case, it is only necessary to notify that the event start time approaches in addition to displaying the name of the user registered for participation as does the message window 232a in the screen 230 of FIG. 14. If the user registered for participation is not logged in and when a login passcode is set up for the user (N in S104 and Y in S106), a passcode entry screen is displayed (S110). The passcode entry screen remains until the user registered for participation successfully logs in, for example, by entering a passcode on the screen (N in S112 and S110). This prevents users other than the user registered for participation from participating in the event without permission, thus abiding by restrictions imposed on the event such as age. It should be noted that the passcode entry screen may be hidden to switch back to the original screen by an operation to cancel automatic activation.

When the user registered for participation successfully logs in through S108 or Y in S112, and if the period of time from that moment to the event start time is equal to a given time Δt4 or longer (N in S114), a countdown clock to the start time is displayed as illustrated in the message window 232b of the screen 234 of FIG. 14 (S116). Here, the given time Δt4 is, for example, five seconds. If the user performs a given cancellation or logout operation while the countdown clock is displayed (Y in S118), the screen is switched back to a state with no countdown clock (S122). The home screen, for example, is displayed if the resume process is performed in S102.

If no cancellation or other operation is performed while the countdown clock is displaying (N in S118), the countdown to the start time continues (N in S120 and S116). Then, when the start time comes (Y in S120), a target game or video display application activates under control of the event participation operation control section 48, switching what displays to a screen that matches the event (S126). On the other hand, if the period of time from the moment of login to the event start time is shorter than the given time Δt4 (Y in S114), a screen is displayed that accepts no more operations to ensure that various processes do not become mixed up (S124).

This screen may be, for example, a standby screen that indicates simple text information such as "Please Wait." Then, when the event start time comes, what displays is switched to a screen that matches the event (S126). By providing a branch in S114, it is possible to change what displays through reasonable steps and accept cancellation operation to the extent allowable in consideration of a case in which it takes the user a long time before he or she enters a passcode and successfully logs in.

Figure 15:
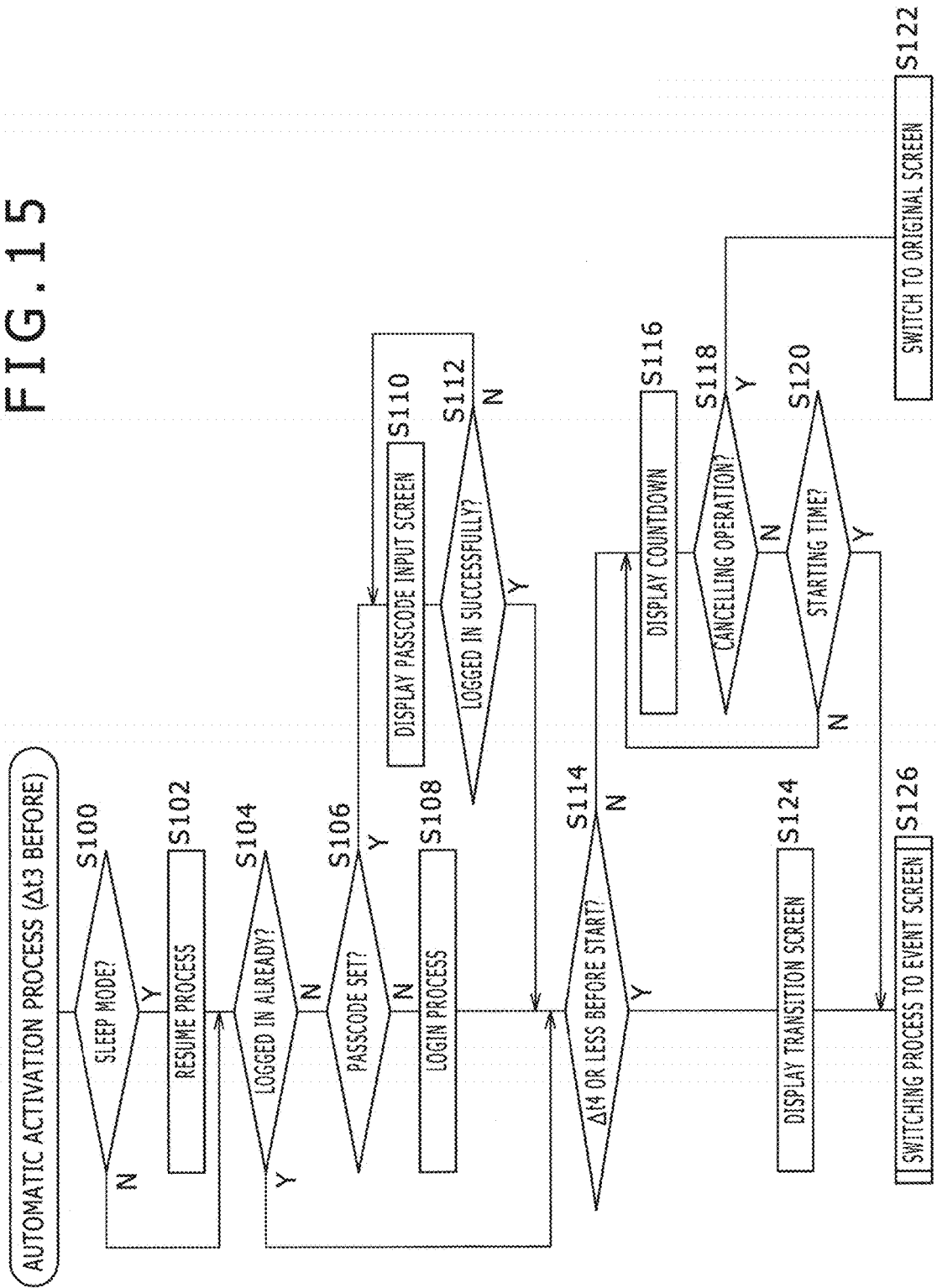
FIG. 15 is a flowchart illustrating an example of steps for the information processing device of a user who is registered for participation in an event to activate automatically in the present embodiment.
Figure 16:
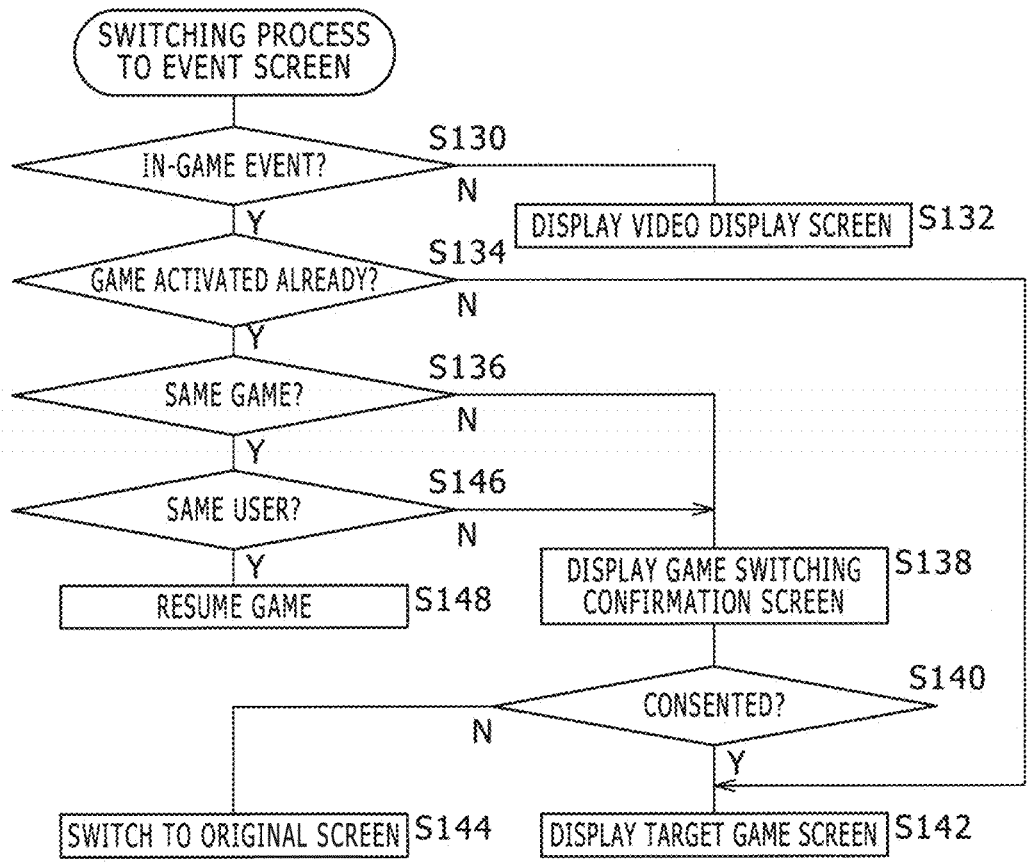
FIG. 16 is a flowchart illustrating steps for the information processing device to switch what displays to an event screen in S126 of FIG. 15.

FIG. 16 illustrates steps for the information processing device 10 to switch what displays to an event screen in S126 of FIG. 15. First, if the target event is not an in-game event, that is, if it is a live delivery event (N in S130), a video display screen is displayed in an as-is manner (S132). If the user was playing other game immediately before the start of the event, a video may be displayed in parallel with processing of the game. At this time, if the original game screen appears in a separate window from the window that is displayed a video, it is possible to play the game while at the same time watching the video or close the video window halfway through the video and exit from the event. Alternatively, the game may be suspended temporarily to display the video.

When the target event is an in-game event (Y in S130), and if the user was playing the game immediately before the start of the event (Y in S134), and if the game in question is different from the game for which the event is organized (N in S136), a screen is displayed to confirm whether what displays may be switched to a screen of the game for which the event is organized (S138). Then, when the user makes an entry to consent to the switching (Y in S140), the game played up to that time is exited or temporarily suspended, and the screen in question is displayed by activating the game for which the event is organized or acquiring screen data from the content provision servers 22 (S142). If an operation to reject the switching such as cancellation operation is performed on the confirmation screen (N in S140), what displays is switched back to the original game screen (S144).

On the other hand, when the user was playing the same game as that for which the event is organized (Y in S130, Y in S134, and Y in S136), and if the user who was playing is different from the user registered for participation (N in S146), a screen is displayed to confirm whether what displays may be switched to a screen of the game for which the event is organized (S138). Also in this case, when the user makes an entry to consent to the switching, the game screen for the event is displayed by reactivating the game with the player replaced or acquiring screen data from the content provision servers 22 (S142). If the switching is rejected (N in S140), what displays is switched back to the original game screen without replacing the player (S144).

When the user registered for participation in the event was playing the same game as that for which the event is organized (Y in S134, Y in S136, and Y in S146), the game is resumed by setting up an event parameter or acquiring screen data from the content provision servers 22 (S148). On the other hand, when the target event is an in-game event (Y in S130), and if nobody was playing the game immediately before the start of the event (N in S134), the screen in question is displayed by activating the game for which the event is organized or acquiring screen data from the content provision servers 22 in an as-is manner (S142).

Thus, by causing a branch to take place in the process through case classification, it is possible to switch between screens while ensuring that there is no inconvenience in consideration of the user who was using the information processing device 10 before the start of the event and details of the process. Further, by leaving a path over which to exit from the automatic activation process in addition to cancellation operation during a countdown period, it is possible for the user to participate in events with minimal time and effort while preventing undesired switching between screens without permission. It should be noted that the process that restores the information processing device 10 from sleep mode in the steps illustrated in FIG. 15 is conducted when a time comes even if the user is not near the information processing device 10 as when he or she is not at home. An application also activates if it is not necessary to enter a passcode.

Therefore, if no user operation takes place until a given period of time such as 30 minutes elapses after the resume process, the event process may be terminated to switch back to sleep mode. This avoids a condition, for example, where only the information processing device 10 is active in an unmanned room. Further, if the display device 16 is off when the resume process is performed, the display device 16 may be powered on under control of the information processing device 10. As the display device 16 is powered on, the user becomes aware that the event starts even if he or she has not paid any attention to the information processing device 10.

Figure 17:
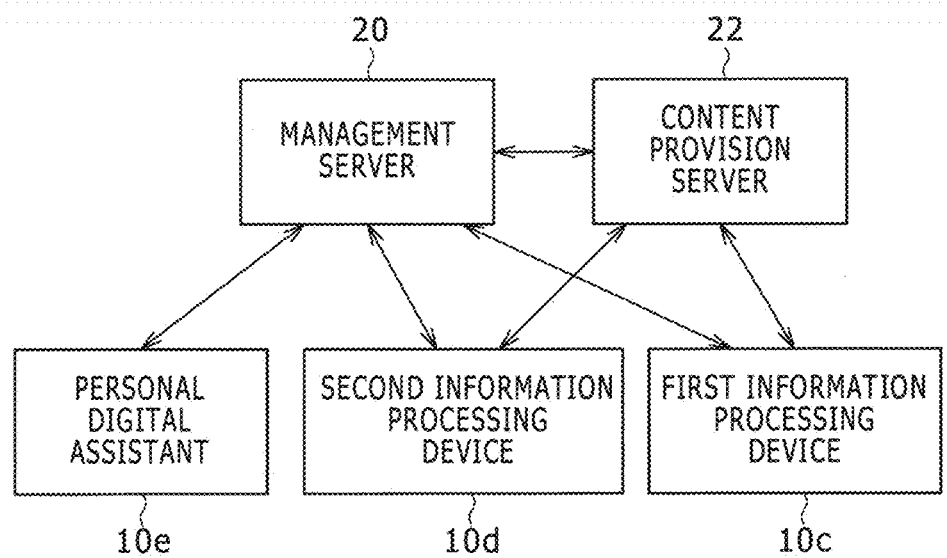
FIG. 17 is a diagram for describing a configuration example of the information processing system that permits use of the plurality of information processing devices in the present embodiment.

It should be noted that the information processing device 10 used to set up or cancel participation registration and automatic activation may be different from the one used when the event starts. FIG. 17 is a diagram for describing a configuration example of the information processing system that permits use of the plurality of information processing devices. In this example, first and second information processing devices 10c and 10d and a personal digital assistant 10e, can be used as the information processing devices 10. The former two are, for example, stationary devices installed indoors such as at home or in an office. If a single user has accounts of these devices, the management server 20 can recognize that the users of these devices are the same irrespective of the devices on the basis of user identification information transmitted from each device together with registration operation information.

When a user can use a plurality of devices as described above, it is more convenient if the user can set up participation registration and automatic activation from a device different from the one used when the event starts. For example, the user decides that the first information processing device 10c is the device that will be mainly used and registers identification information thereof such as IP address in the management server 20 in advance. Then, if participation registration or automatic activation is set up from the personal digital assistant 10e, the management server 20 designates the first information processing device 10c to handle event start notification and automatic activation and sets up the first information processing device 10c to monitor the time.

On the other hand, if participation registration or automatic activation is set up using the first information processing device 10c or the second information processing device 10d, the same device is designated to handle event start notification and automatic activation. If automatic activation is set up or cancelled for an event in which the user is registered for participation, operation from the personal digital assistant 10e is reflected in the first information processing device 10c. This makes it possible to set up participation registration and automatic activation through simple operation casually on an anytime and anywhere basis using the personal digital assistant 10e and automatically activate the first information processing device 10c, the device mainly used when events start.

It is possible to cancel automatic activation of the first information processing device 10c away from home using the personal digital assistant 10e in the event of inconvenience when the first information processing device 10c has been set up for automatic activation. Further, if the user wishes to use the second information processing device 10d in a hurry depending on the location, it is possible to readily switch the device to use from the first information processing device 10c to the second information processing device 10d. It should be noted, however, that the rule for deciding which device to use when an event starts is not limited to the above. For example, the user may choose a device to use when participating in an event each time he or she sets up participation registration or automatic activation.

In the present embodiment described above, events held by a plurality of organizers such as in-game events and live delivery events are compiled and managed, presenting the events in a manner appropriate for each user. More specifically, the present embodiment presents recommended events by factoring in user's game play tendencies and trends of other users who are registered as friends and displays lists of events by classifying events by a combination of conditions, namely, user behaviors such as "participated," "registered for participation," and "not registered" and event states such as "ended," "in progress," and "not started." Further, information about friend users registered for participation in each event is displayed together. These configurations contribute to more chances to be aware of the existence of events and games and allow for each user to find desired events to be participated efficiently.

Still further, screens that indicate details of events are displayed in a consistent format, albeit using images prepared by organizers, thus providing increased access to each item without degrading the world views of events and games and facilitating comparison between the events. Still further, the user is notified at a given time such as immediately prior to the start of an event for all events in which the user is registered for participation. Still further, depending on the user's setup, the device and an application are activated automatically in step with the start date and time.

If there is a change to the event start schedule, the time setups for notice and activation are also modified. These configurations make the user aware of the start of an event in a manner desired by the user, thus reducing the likelihood that the user may unexpectedly miss his or her opportunity to participate. Further, the user's interest in the event and game can be aroused again in step with the start of the event. Still further, changes to the schedule of the event for which the user is registered can be responded to flexibly without the user having to check information and perform the setup again. Still further, participation registration and automatic activation can be set up from an information processing device different from the one used to participate in events, thus providing increased opportunities for participation in events and responding to changes in user's convenience and feelings as occasion arises.

The present disclosure has been described above on the basis of an embodiment. It should be understood by those skilled in the art that the above embodiment is illustrative, that the combination of components and processes can be modified in various ways, and that such modification examples also fall within the scope of the present disclosure.

The present disclosure contains subject matter related to that disclosed in Japanese Priority Patent Application JP 2015-169746 filed in the Japan Patent Office on Aug. 28, 2015, the entire content of which is hereby incorporated by reference.

What is claimed is:

1. An information processing device for acquiring, via a network, data provided as an event by a content provision server for a set duration and performing an information processing task using the data, the information processing device including a processor and a non-transitory computer-readable recording medium storing a computer program and elements, which when executed by the information processing device, causes the information processing device to implement elements, comprising:

an event participation operation control section that acquires, from a management server that manages an event in which a user of the information processing device is registered for participation, setup data that sets up a given operation to be started at a given time relative to a start time of the event in which the user is registered for participation, and to control the information processing device such that the given operation is performed at the given time specified by the setup data; and an information processing section that performs an information processing task using the event data acquired from the content provision server and generate output data in response to the given operation having been performed, wherein the events are scheduled opportunities for the user, among a plurality of users, to participate in on-line interactive gameplay through the event management server, wherein the information processing section that determines whether the information processing device is in an automated mode of operation, whereby the given operation does not require a user operation such that the information processing task is automatically started at the given time of the event, and wherein the information processing section that requires the user operation prior to starting the information processing task at the given time of the event when the information processing device is not in the automated mode of operation, and wherein the event participation operation control section causes the information processing section to start the information processing task to be performed using the event data at the given time, and wherein at least one of:

(i) when the user who is using the information processing device is different from the user registered for participation in the event, the event participation operation control section displays, on a connected display device, an image that asks whether it is acceptable to start the information processing task to be performed using the event data at the given time, and when an input indicating that it is acceptable to do so is made, the event participation operation control section causes the information processing section to start the information processing task;

(ii) when the information processing task being run by the information processing device is different from that to be performed using the event data, the event participation operation control section displays, on a connected display device, an image that asks whether it is acceptable to start the information processing task to be performed using the event data at the given time, and when an input indicating that it is acceptable to do so is made, the event participation operation control section causes the information processing section to start the information processing task; and (iii) when the user registered for participation in the event is not logged into the information processing device, the event participation operation control section displays, on a connected display device, an authentication screen for login at the given time, and when the authentication is successful, the event participation operation control section causes the information processing section to start the information processing task to be performed using the event data.

2. The information processing device of claim 1 further comprising:
an input information acquisition section that accepts a user operation to register for participation in an event scheduled to start; and
a communication section that transmits details of the user operation to register for participation to the management server via the network.

3. The information processing device of claim 1, wherein when the information processing device is in sleep mode with its processing functionality disabled, the event participation operation control section restores the processing functionality to normal at the given time.

4. The information processing device of claim 1, wherein the event participation operation control section changes when to start the given operation on the basis of the changed setup data transmitted from the management server in response to a change made to a schedule of the event in which the user is registered for participation.

5. The information processing device of claim 1, wherein the event participation operation control section displays, at the given time and on a connected display device, an image that notifies that the event in which the user is registered for participation starts.

6. An event management server including a processor and a non-transitory computer-readable recording medium storing a computer program and elements, which when executed by the server, causes the server to implement elements, comprising:
a correlation information preparation section that prepares registration information that correlates a user of an information processing device with an event in which the user is registered for participation; and
a participation operation setup section that prepares, on the basis of the registration information, setup data that sets up a given operation to be started by the information processing device at a given time relative to a start time of the event in which the user is registered for participation and to transmit the setup data to the information processing device,
wherein the events are scheduled opportunities for the user, among a plurality of users, to participate in on-line interactive gameplay through the event management server,
wherein the information processing device performs the information processing task using the event data acquired from a content provision server and generate output data in response to the given operation having been performed,
wherein the information processing device is adapted to determine whether the information processing device is in an automated mode of operation, whereby the given operation does not require a user operation such that the information processing task is automatically started at the given time of the event, and
wherein the information processing devices requires the user operation prior to starting the information processing task at the given time of the event when the information processing device is not in the automated mode of operation, and
wherein the information processing device starts the information processing task to be performed using the event data at the given time, and wherein at least one of:

(i) when the user who is using the information processing device is different from the user registered for participation in the event, the information processing device displays, on a connected display device, an image that asks whether it is acceptable to start the information processing task to be performed using the event data at the given time, and when an input indicating that it is acceptable to do so is made, the information processing device causes the start the information processing task;

(ii) when the information processing task being run by the information processing device is different from that to be performed using the event data, the information processing device displays, on a connected display device, an image that asks whether it is acceptable to start the information processing task to be performed using the event data at the given time, and when an input indicating that it is acceptable to do so is made, the information processing device causes the start the information processing task; and (iii) when the user registered for participation in the event is not logged into the information processing device, the information processing device displays, on a connected display device, an authentication screen for login at the given time, and when the authentication is successful, the information processing device causes the start the information processing task to be performed using the event data.

7. The event management server of claim 6, wherein the participation operation setup section modifies the setup data in response to a change made to a schedule of the event in which the user is registered for participation and transmits the setup data to the information processing device again so as to change when to start the given operation.

8. The event management server of claim 6 further comprising:
a communication section that acquires, via the network, details of a user operation performed on the information processing device to register for participation in an event scheduled to start;
wherein the correlation information preparation section prepares the registration information on the basis of information acquired by the communication section.

9. An event participation method used by an information processing device, the event participation method comprising:
acquiring, from a management server that manages an event in which a user of the information processing device is registered for participation, setup data that sets up a given operation to be started at a given time relative to a start time of the event in which the user is registered for participation;
controlling the information processing device such that the given operation is performed at the time specified by the setup;
performing an information processing task using the event data acquired from the content provision server and generating output data in response to the given operation having been performed, wherein the events are scheduled opportunities for the user, among a plurality of users, to participate in on-line interactive gameplay through the event management server;

determining whether the information processing device is in an automated mode of operation, whereby the given operation does not require a user operation such that the information processing task is automatically started at the given time of the event; and requiring the user operation prior to starting the information processing task at the given time of the event when the information processing device is not in the automated mode of operation, wherein the information processing device starts the information processing task to be performed using the event data at the given time, and wherein at least one of:

(i) when the user who is using the information processing device is different from the user registered for participation in the event, the information processing device displays, on a connected display device, an image that asks whether it is acceptable to start the information processing task to be performed using the event data at the given time, and when an input indicating that it is acceptable to do so is made, the information processing device causes the start the information processing task;

(ii) when the information processing task being run by the information processing device is different from that to be performed using the event data, the information processing device displays, on a connected display device, an image that asks whether it is acceptable to start the information processing task to be performed using the event data at the given time, and when an input indicating that it is acceptable to do so is made, the information processing device causes the start the information processing task; and (iii) when the user registered for participation in the event is not logged into the information processing device, the information processing device displays, on a connected display device, an authentication screen for login at the given time, and when the authentication is successful, the information processing device causes the start the information processing task to be performed using the event data.

10. An event participation management method by an event management server, comprising:

preparing registration information that correlates a user of an information processing device with an event in which the user is registered for participation;

preparing, on the basis of the registration information, setup data that sets up a given operation to be started by the information processing device at a given time relative to a start time of the event in which the user is registered for participation; and transmitting the setup data to the information processing device via a network, wherein the events are scheduled opportunities for the user, among a plurality of users, to participate in on-line interactive gameplay through the event management server, wherein the information processing device performs the information processing task using the event data acquired from a content provision server and generate output data in response to the given operation having been performed, wherein the information processing device is adapted to determine whether the information processing device is in an automated mode of operation, whereby the given operation does not require a user operation such that the information processing task is automatically started at the given time of the event, and wherein the information processing device requires the user operation prior to starting the information processing task at the given time of the event when the information processing device is not in the automated mode of operation, and wherein the information processing device starts the information processing task to be performed using the event data at the given time, and wherein at least one of:

(i) when the user who is using the information processing device is different from the user registered for participation in the event, the information processing device displays, on a connected display device, an image that asks whether it is acceptable to start the information processing task to be performed using the event data at the given time, and when an input indicating that it is acceptable to do so is made, the information processing device causes the start the information processing task;

(ii) when the information processing task being run by the information processing device is different from that to be performed using the event data, the information processing device displays, on a connected display device, an image that asks whether it is acceptable to start the information processing task to be performed using the event data at the given time, and when an input indicating that it is acceptable to do so is made, the information processing device causes the start the information processing task; and (iii) when the user registered for participation in the event is not logged into the information processing device, the information processing device displays, on a connected display device, an authentication screen for login at the given time, and when the authentication is successful, the information processing device causes the start the information processing task to be performed using the event data.

11. A non-transitory, computer-readable recording medium storing a computer program, which when executed by a computer to carry out actions of an information processing apparatus, comprising:

acquiring, from a management server that manages an event in which a user of the information processing device is registered for participation, setup data that sets up a given operation to be started at a given time relative to a start time of the event in which the user is registered for participation;

controlling the information processing device such that the given operation is performed at the time specified by the setup;

performing an information processing task using the event data acquired from the content provision server and generating output data in response to the given operation having been performed, wherein the events are scheduled opportunities for the user, among a plurality of users, to participate in on-line interactive gameplay through the event management server;

determining whether the information processing device is in an automated mode of operation, whereby the given operation does not require a user operation such that the information processing task is automatically started at the given time of the event; and requiring the user operation prior to starting the information processing task at the given time of the event when the information processing device is not in the automated mode of operation, and wherein the information processing device starts the information processing task to be performed using the event data at the given time, and wherein at least one of:

(i) when the user who is using the information processing device is different from the user registered for participation in the event, the information processing device displays, on a connected display device, an image that asks whether it is acceptable to start the information processing task to be performed using the event data at the given time, and when an input indicating that it is acceptable to do so is made, the information processing device causes the start the information processing task;

(ii) when the information processing task being run by the information processing device is different from that to be performed using the event data, the information processing device displays, on a connected display device, an image that asks whether it is acceptable to start the information processing task to be performed using the event data at the given time, and when an input indicating that it is acceptable to do so is made, the information processing device causes the start the information processing task; and (iii) when the user registered for participation in the event is not logged into the information processing device, the information processing device displays, on a connected display device, an authentication screen for login at the given time, and when the authentication is successful, the information processing device causes the start the information processing task to be performed using the event data.

12. A non-transitory, computer-readable recording medium storing a computer program, which when executed by a computer, causes the computer to carry out actions, comprising:

preparing registration information that correlates a user of an information processing device with an event in which the user is registered for participation; and preparing, on the basis of the registration information, setup data that sets up a given operation to be started by the information processing device at a given time relative to a start time of the event in which the user is registered for participation and transmitting the setup data to the information processing device, wherein the events are scheduled opportunities for the user, among a plurality of users, to participate in on-line interactive gameplay through the event management server, wherein the information processing device performs the information processing task using the event data acquired from a content provision server and generate output data in response to the given operation having been performed, wherein the information processing device is adapted to determine whether the information processing device is in an automated mode of operation, whereby the given operation does not require a user operation such that the information processing task is automatically started at the given time of the event, and wherein the information processing device requires the user operation prior to starting the information processing task at the given time of the event when the information processing device is not in the automated mode of operation, and wherein the information processing device starts the information processing task to be performed using the event data at the given time, and wherein at least one of:

(i) when the user who is using the information processing device is different from the user registered for participation in the event, the information processing device displays, on a connected display device, an image that asks whether it is acceptable to start the information processing task to be performed using the event data at the given time, and when an input indicating that it is acceptable to do so is made, the information processing device causes the start the information processing task;

(ii) when the information processing task being run by the information processing device is different from that to be performed using the event data, the information processing device displays, on a connected display device, an image that asks whether it is acceptable to start the information processing task to be performed using the event data at the given time, and when an input indicating that it is acceptable to do so is made, the information processing device causes the start the information processing task; and (iii) when the user registered for participation in the event is not logged into the information processing device, the information processing device displays, on a connected display device, an authentication screen for login at the given time, and when the authentication is successful, the information processing device causes the start the information processing task to be performed using the event data.

* * * * *